US009135787B1

(12) United States Patent
Russell et al.

(10) Patent No.: US 9,135,787 B1
(45) Date of Patent: Sep. 15, 2015

(54) BITCOIN KIOSK/ATM DEVICE AND SYSTEM INTEGRATING ENROLLMENT PROTOCOL AND METHOD OF USING THE SAME

(71) Applicants: Mark Russell, Reno, NV (US); John W. Russell, Reno, NV (US)

(72) Inventors: Mark Russell, Reno, NV (US); John W. Russell, Reno, NV (US)

( * ) Notice: Subject to any disclaimer, the term of this patent is extended or adjusted under 35 U.S.C. 154(b) by 0 days.

(21) Appl. No.: 14/245,971

(22) Filed: Apr. 4, 2014

(51) Int. Cl.
*G06Q 40/00* (2012.01)
*G07D 11/00* (2006.01)
*G07F 19/00* (2006.01)

(52) U.S. Cl.
CPC .................................... *G07F 19/201* (2013.01)

(58) Field of Classification Search
CPC ......... G06K 5/00; G06K 19/06; G06Q 40/00; G06F 17/00; G06F 7/08; G07F 19/00
USPC ............ 235/379, 375, 380, 381, 487; 705/44, 705/45
See application file for complete search history.

(56) References Cited

U.S. PATENT DOCUMENTS

2003/0015583 A1* 1/2003 Abdi et al. .................... 235/379
2003/0217005 A1* 11/2003 Drummond et al. ............ 705/43
2008/0011824 A1* 1/2008 Swift et al. .................... 235/379
2012/0160912 A1* 6/2012 Laracey ........................ 235/379
2013/0332349 A1* 12/2013 Dent .............................. 705/40

* cited by examiner

*Primary Examiner* — Edwyn Labaze
(74) *Attorney, Agent, or Firm* — Greenberg Traurig, LLP

(57) ABSTRACT

A standalone Bitcoin kiosk/ATM device including a bill validator, bill dispenser, printer, one or more scanners/readers, touch screen display, processor/controller and wireless internet connection means (e.g. modem). An enrollment and security protocol involves a processor programmed to run executable instructions, said executable instructions causing said processor to facilitate: (i) receipt of a customer's mobile phone number via the user interface; (ii) transmission of a text message including a random code to the mobile phone of the customer; (iii) receipt and confirmation of the random code entered by the customer via the user interface; (iv) receipt of a PIN entered by the customer via the user interface; (v) receipt of a palm vein pattern via the biometric interface; (vi) receipt of a customer photo via the camera; and (vii) receipt of identification data including photo via the ID scanner/reader.

12 Claims, 28 Drawing Sheets

FIG. 4C
610
Buy Bitcoin
Scan Your QR Code now or type in your receiving address in the field below.
611
(Scan your Bitcoin Deposit Address Now)
612
฿1.17108429
<-- The going rate
Cancel
3.5%
<-- Our Fee
Next
613
฿1.13009634
<-- Your Price
614
615

FIG. 4D
620
Buy Bitcoin
Success! Your Bitcoin is on its way!
฿1.13009634 has been sent to:
19xoJbvyfJQKHYBpu5JD9a4mczFC7QCAoS
Verify here:
621
http://goo.gl/poOHO
Finish
622

FIG. 4F
635
Sell Bitcoin
Send The Bitcoin Now
636
Send B1.212072246 to
12RWyU7c54ndpB6WMN7fUoDEzFccpkeBuN
in 4:47
637
Finish
638

FIG. 4H
645
Redeem Receipt
Withdraw
$40
Available
Cancel
Withdraw
646

903

970

BITCOIN KIOSK/ATM DEVICE AND SYSTEM INTEGRATING ENROLLMENT PROTOCOL AND METHOD OF USING THE SAME

FIELD OF THE INVENTION

The embodiments of the present invention relate to a Bitcoin kiosk/ATM device, system and method which facilitate the buying and selling of Bitcoin without the need for any third-party financial institution (e.g., banks).

BACKGROUND

Bitcoin is a decentralized digital currency based on an open-source peer-to-peer internet protocol. Bitcoin is by most accounts the most widely accepted alternative currency having a monetary base in excess of $1 billion (USD) and is accepted by merchants, including service providers, throughout the world. Bitcoin is managed unlike most typical currencies and such that the need for a central bank is eliminated. Instead, as referenced above, Bitcoin is managed via an internet-based peer-to-peer network.

It would be advantageous, to develop a standalone device capable of facilitating the purchase and sale of Bitcoin. Such a device should not require the use of any central monetary authority.

SUMMARY

Accordingly, one embodiment of the present invention comprises a standalone Bitcoin kiosk/ATM device including at least the following components: (i) a bill validator; (ii) bill dispenser; (iii) printer; (iv) code scanner; (v) touch screen display; (vi) computing power in the form of a processor/controller; and (vii) internet connection means. The standalone device may include other components such as a backup power supply. The computing power may be local or remote as part of a Bitcoin kiosk/ATM network. A plurality of devices and central computer/server may form a network of devices.

In practice, the standalone device facilitates the purchase of Bitcoin by: (i) permitting a user to deposit traditional currency (e.g., United States dollars); (ii) reading a code related to a digital account for receiving the purchased Bitcoin; (ii) confirming that the standalone device has sufficient Bitcoin to fund the purchase; (iv) generating and printing a receipt of the transaction. If the standalone device does not have sufficient funds to complete the transaction, the standalone device may acquire the necessary Bitcoin from the spot market by connecting to a Bitcoin exchange such as Bitstamp (www.bitstamp.net).

In practice, the standalone device facilitates the sale of Bitcoin via two stages. A first stage comprises: (i) accepting an amount of desired traditional currency (e.g., United States dollars) as entered by the user; (ii) creating a transaction in a database; (iii) prompting the user to transmit the user's Bitcoin to a digital address assigned to the standalone device; and (iv) generating and printing a redemption receipt. A second stage comprises a user redeeming the redemption receipt during which: (i) the redemption receipt is electronically read; (ii) a comparison of the redemption receipt to the transaction in the database is conducted; (iii) a network confirmation of the user's Bitcoin is conducted; (iv) a confirmation that the redemption receipt has not been redeemed is conducted; and (v) cash is dispensed from the standalone device.

Some of the steps required to buy and sell the Bitcoin may also be accomplished via a remote device such as a computer or smart phone which interacts with the standalone device.

An enrollment and security protocol generally involves (i) a customer/user entering a mobile phone number into the Bitcoin kiosk/ATM device; (ii) a SMS or text message including a random code being sent to the mobile phone; (iii) the user entering the code into the Bitcoin kiosk/ATM device; (iv) the user entering and confirming a PIN; (v) the user providing a palm vein pattern; (vi) the user posing for a photo; and (vii) the user scanning their driver's license or passport.

Other variations, embodiments and features of the present invention will become evident from the following detailed description, drawings and claims.

DETAILED DESCRIPTION

Figure 1:
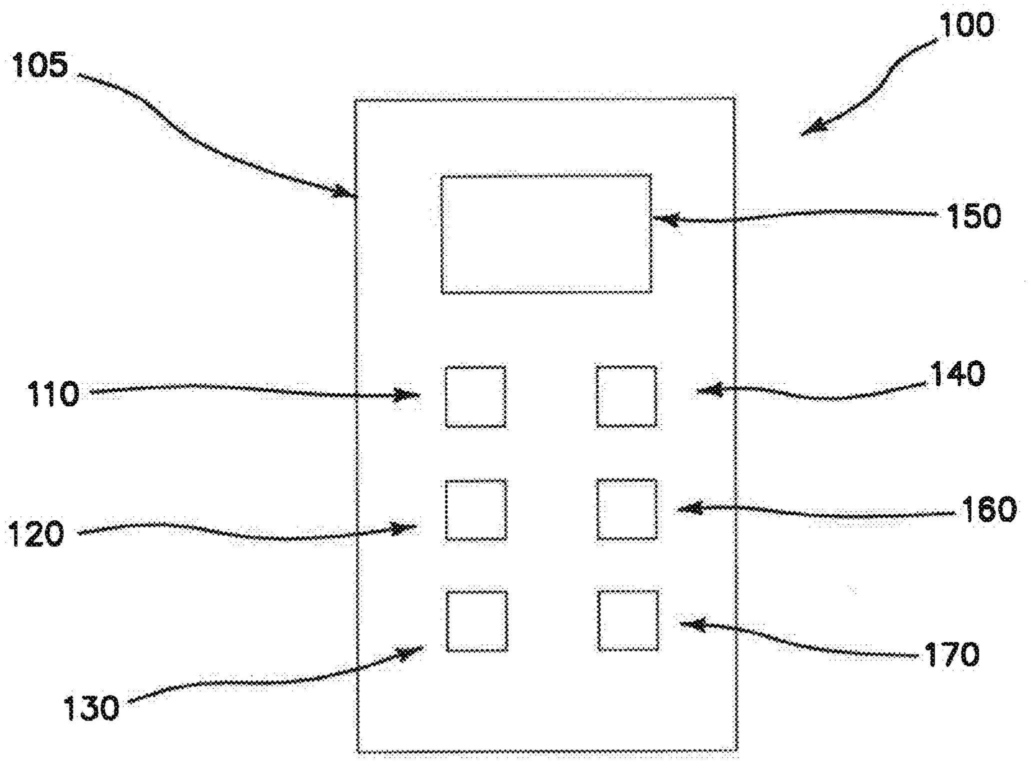
FIG. 1 illustrates a block diagram of a Bitcoin kiosk/ATM device according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a Bitcoin kiosk/ATM according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

Figure 5:
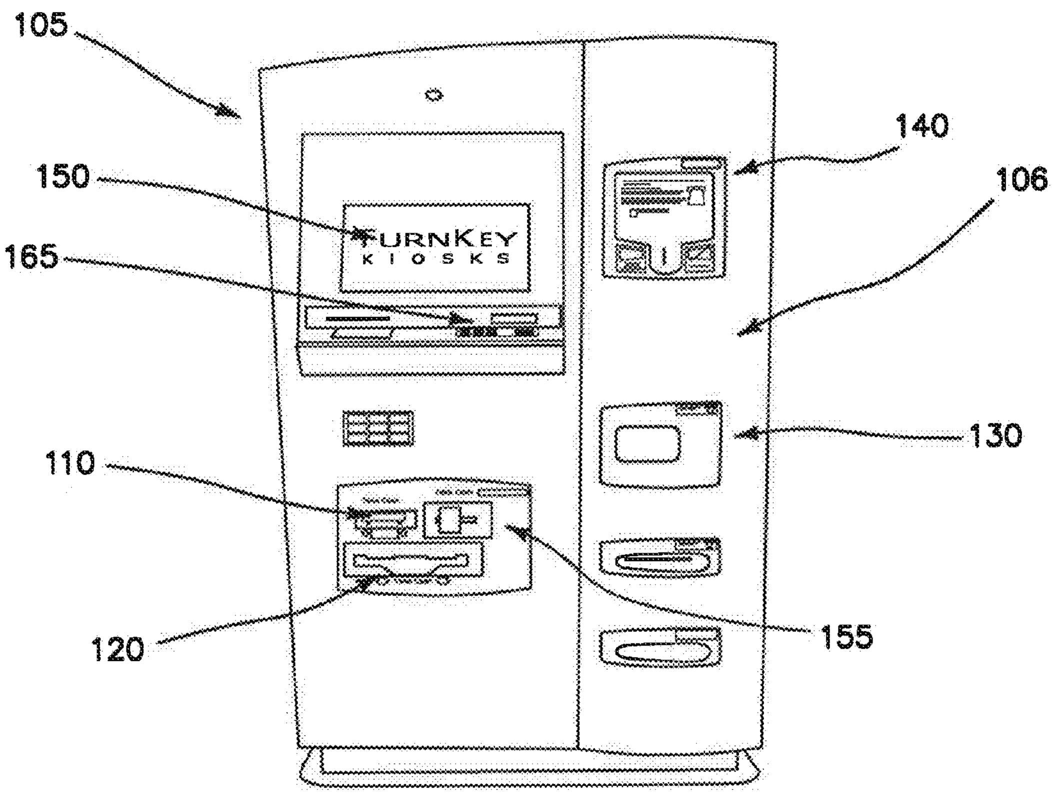
FIG. 5 illustrates an exemplary kiosk/ATM device design of the type which may be used to facilitate the embodiments of the present invention.

FIG. 1 shows a block diagram of a Bitcoin kiosk/ATM device 100 according to the embodiments of the present invention. Broadly, the Bitcoin/ATM device 100 comprises a bill validator 110, bill dispenser 120, printer 130, code reader/scanner 140, touch screen display 150, processor/controller 160 and wireless internet connection means (e.g. modem) 170 communicatively joined together using conventional means. A housing 105 contains and protects the aforementioned components and any others incorporated into the Bitcoin kiosk/ATM device 100. The housing 105 may define a standalone device, wall-mounted device, wall-embedded device and the like. As set forth above, software and firmware assist with the operation of the Bitcoin kiosk/ATM 100 as detailed below. While a touch screen display 150 is described herein, other user interfaces, such as a button panel, track ball and joystick, may be used as well. FIG. 5 shows an exemplary housing elevation 106 containing a bill validator 110, bill dispenser 120, printer 130, code reader/scanner 140 and touch screen display 150 which may facilitate the embodiments of the present invention.

Figure 2:
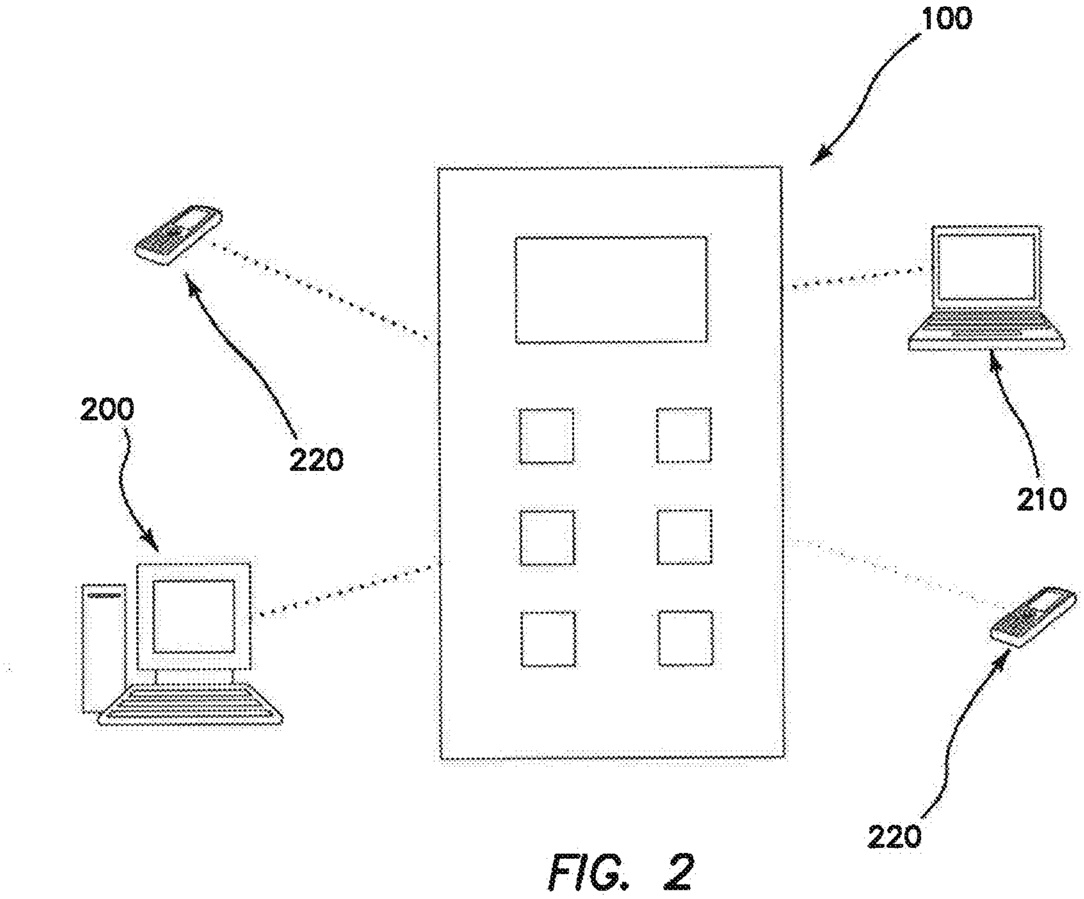
FIG. 2 illustrates a block diagram of a Bitcoin kiosk/ATM device with access via remote devices according to the embodiments of the present invention.

FIG. 2 shows the Bitcoin kiosk/ATM device 100 in communication with various remote devices including a desktop computer 200, laptop computer 210, smart phone 220 and smart tablet 230. In such an embodiment, the Bitcoin kiosk/ATM device 100 incorporates a RF transceiver 180 for communicating with said remote devices. The wireless communication link between the remote devices and Bitcoin kiosk/ATM 100 allows users to transact some aspects of Bitcoin purchases and sales remotely as described in more detail below.

Figure 3:
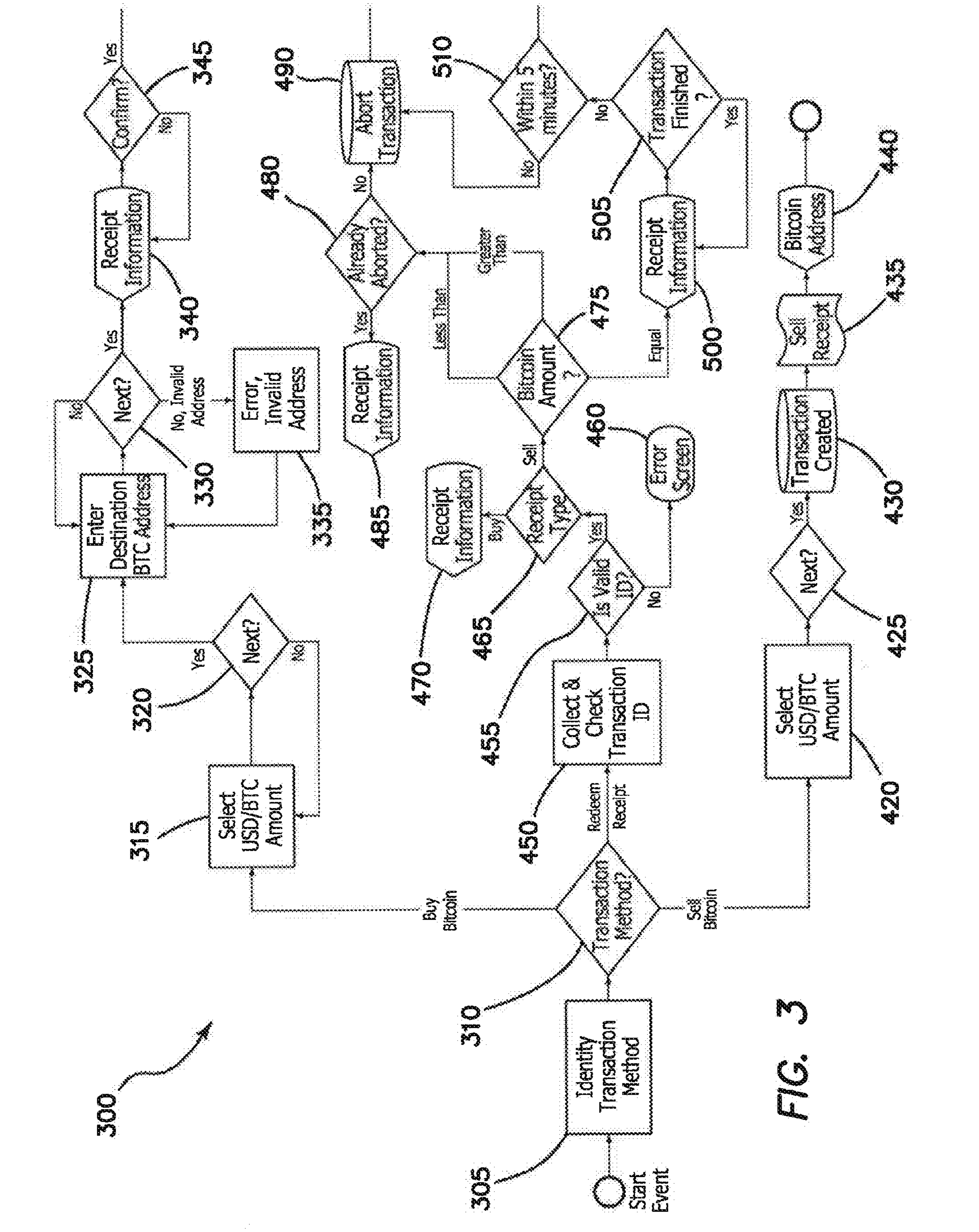
FIG. 3 illustrates a flow chart detailing an exemplary methodology followed by the Bitcoin kiosk/ATM according to the embodiments of the present invention.
Figure 3:
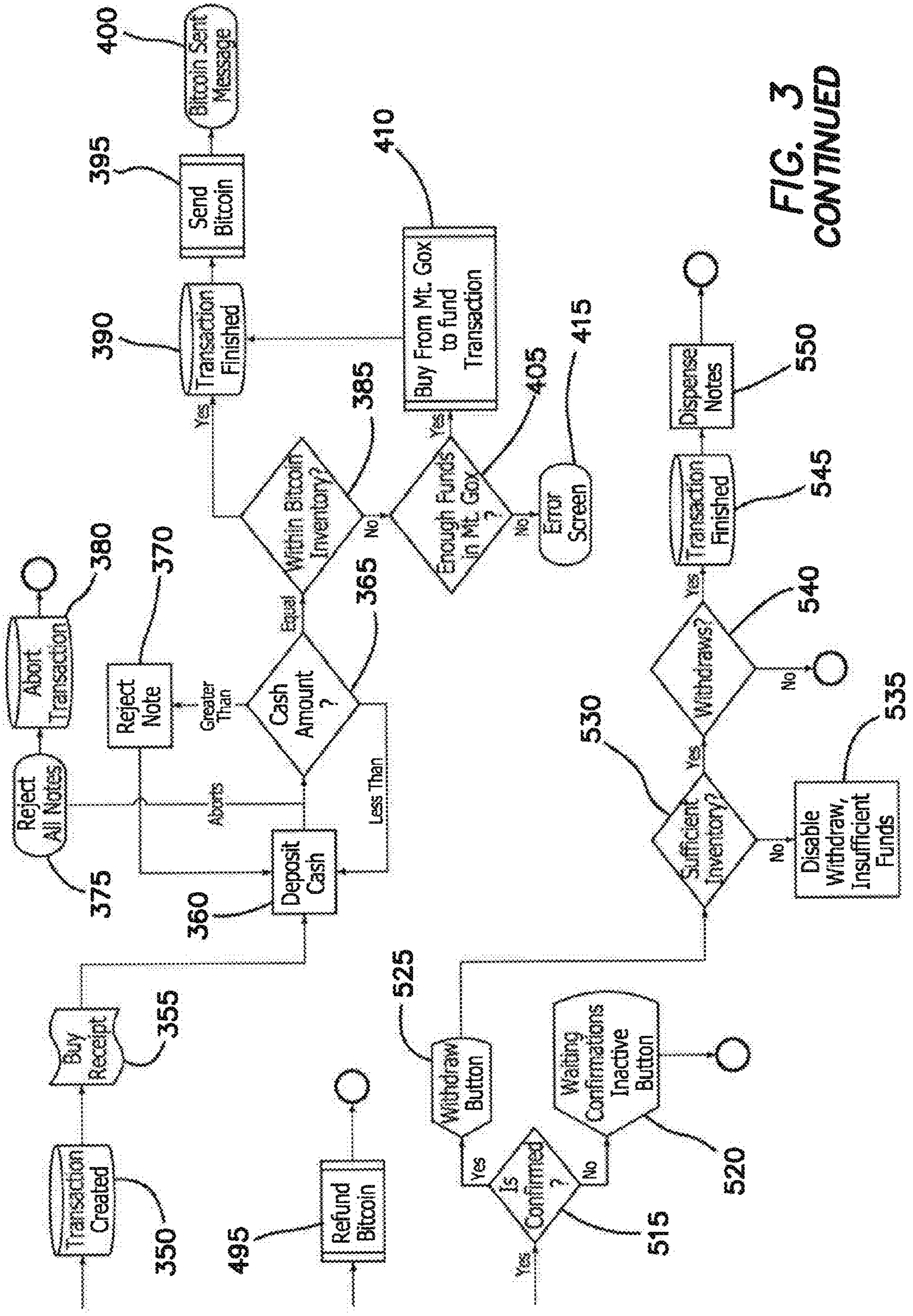
Figure 4A:
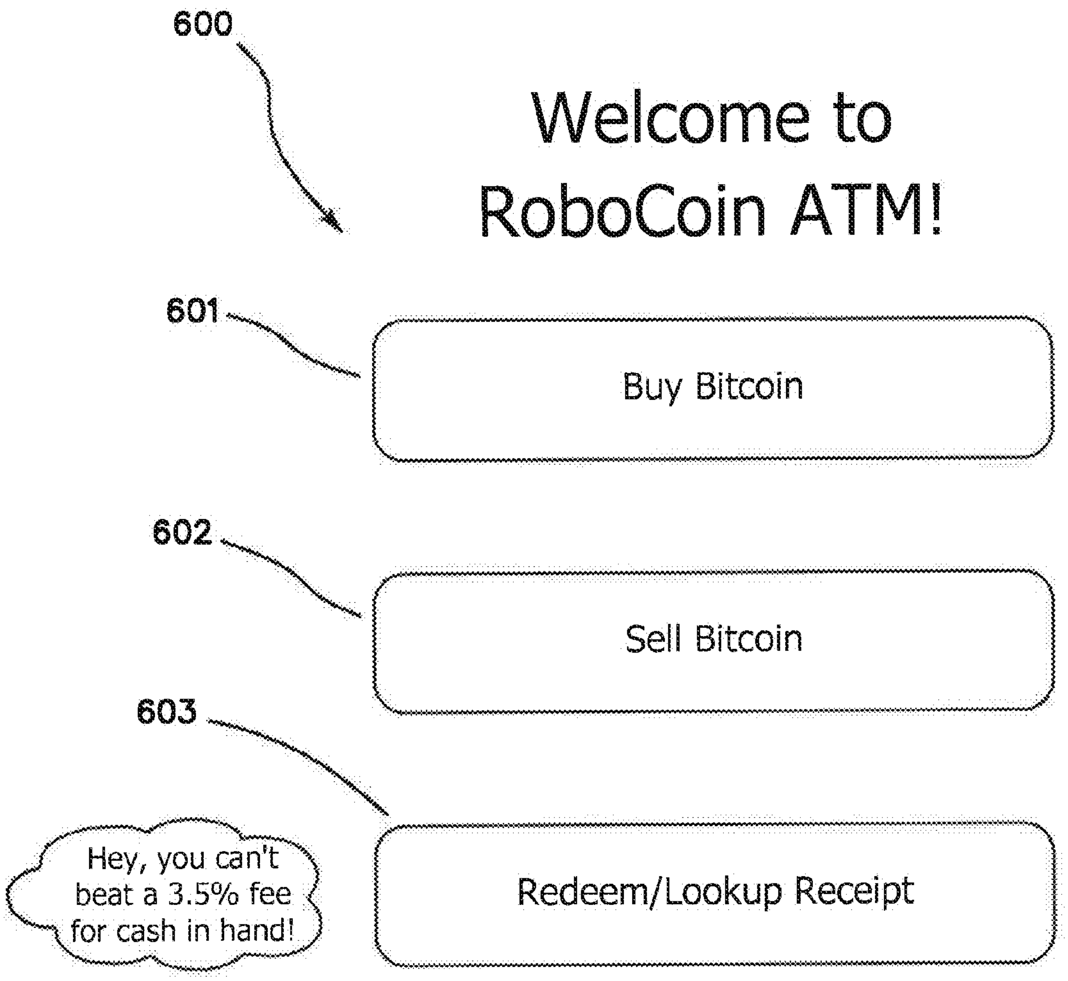
FIGS. 4*a*-4*h* illustrates a series of exemplary screen shots of a user interface associated with the Bitcoin kiosk/ATM according to the embodiments of the present invention.
Figure 4B:
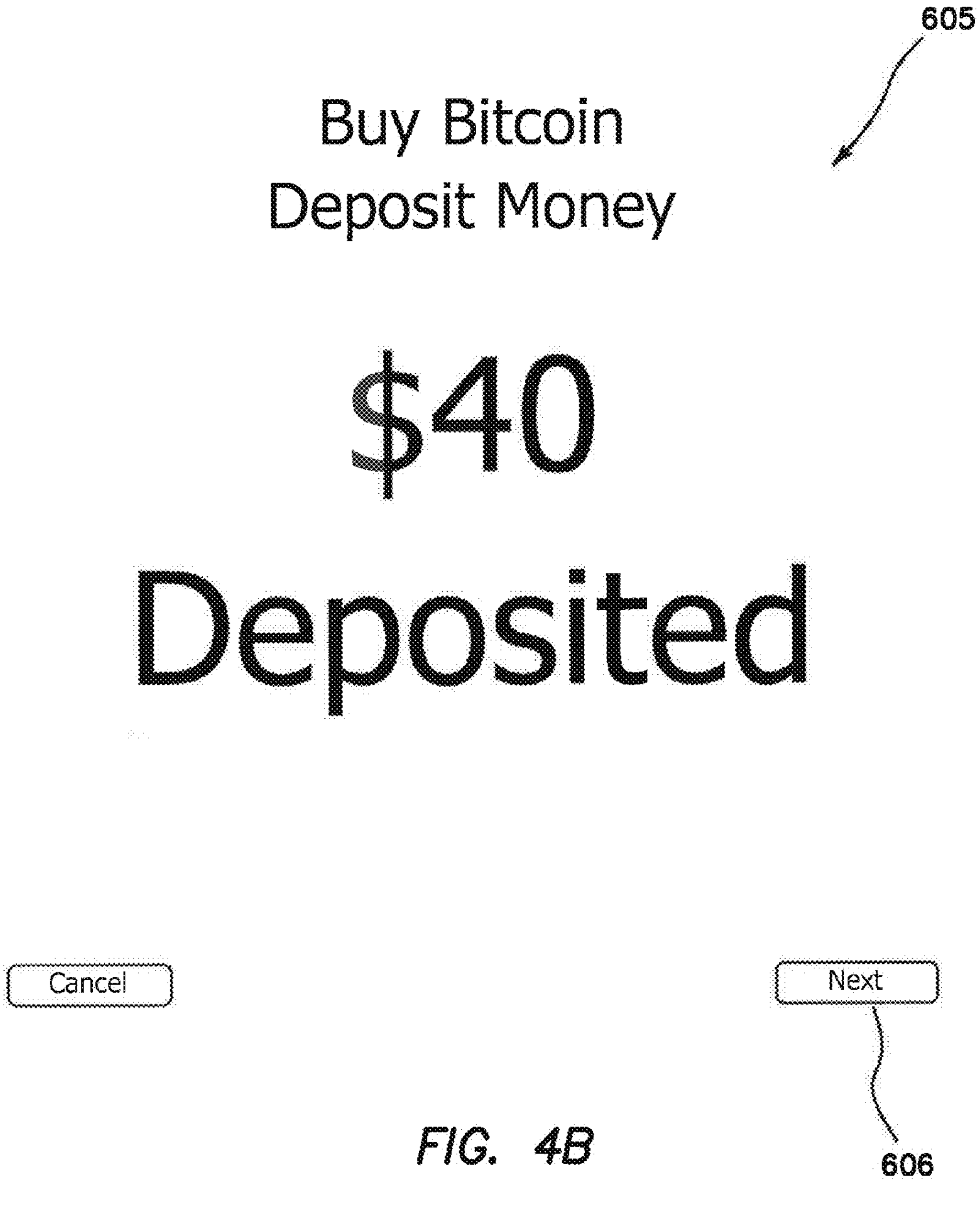
Figure 4C:
Figure 4D:
Figure 4E:
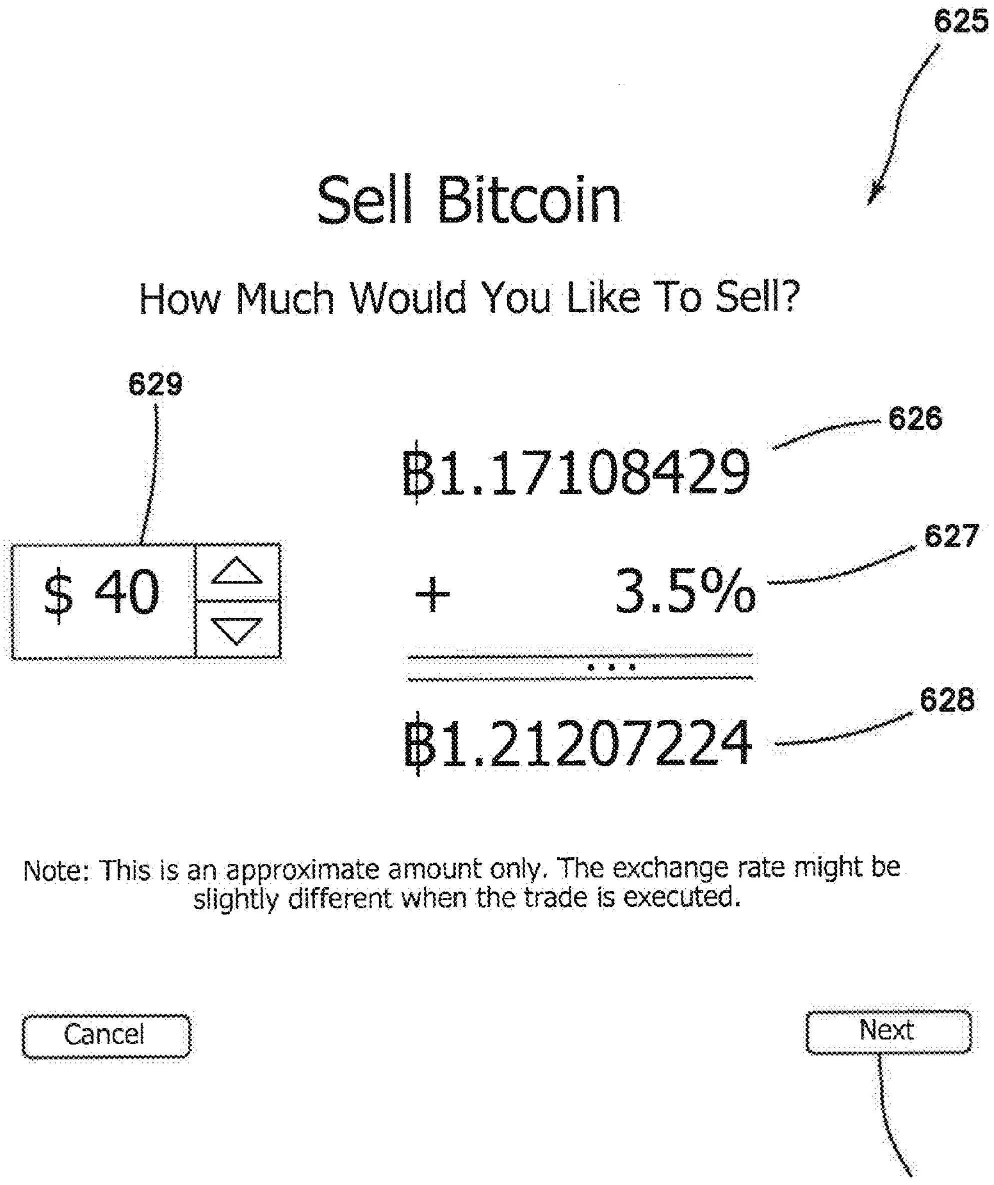
Figure 4F:
Figure 4G:
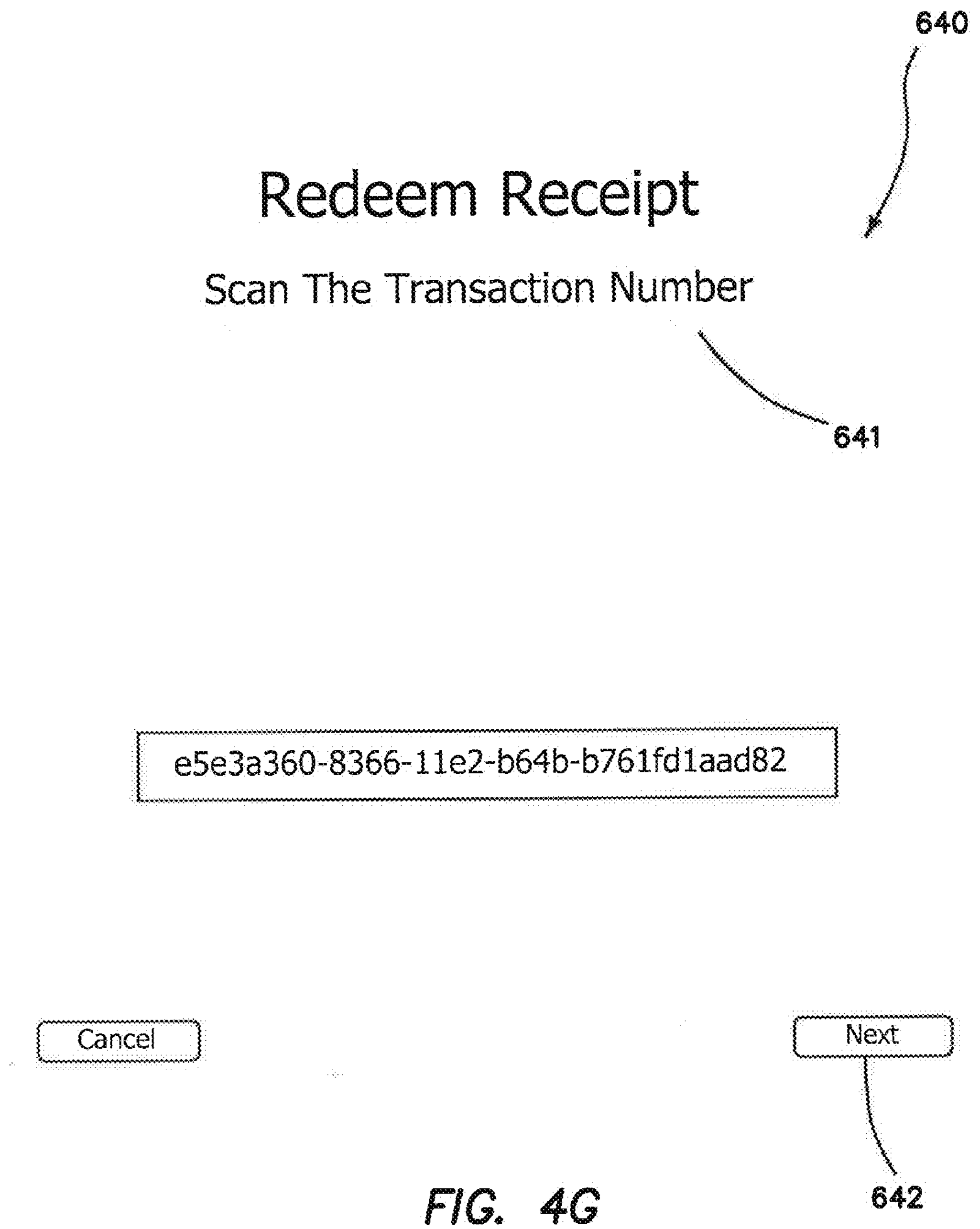
Figure 4H:

The Bitcoin kiosk/ATM device 100 facilitates Bitcoin transactions including purchases and sales of Bitcoin. FIG. 3 shows a flow chart 300 detailing one operational methodology followed by the Bitcoin kiosk/ATM device 100. The first process 305 is associated with determining the transaction type. At 310, it is determined whether the transaction type is a purchase of Bitcoin, sale of Bitcoin or receipt redemption based on the user's interaction with the Bitcoin kiosk/ATM device 100.

If, at 310, it is determined that the desired transaction type is the purchase of Bitcoin, at 315, the user selects an amount of Bitcoin to purchase or amount of conventional currency to exchange for Bitcoin. At 320, it is determined if the user has made the selection. If, at 320, no selection is made in a pre-established time frame, the chart 300 loops back to 320. Once a selection is made at 320, at 325, a destination Bitcoin address is entered by the user. The destination Bitcoin address is a digital address which is configured to receive the Bitcoin when electronically dispensed by the Bitcoin kiosk/ATM device 100. In one embodiment, the user enters the destination Bitcoin address by manually entering the same via the touch screen display 150. In another embodiment, the code reader/scanner 140 reads a QR code, barcode or the like representing the destination Bitcoin address and which is depicted on the user's smart phone or similar electronic device. At 330, it is determined whether a destination Bitcoin address has been entered, not entered or entered improperly. If no Bitcoin address has been entered, the chart 300 loops back to 330. If an invalid code is entered at 330, at 335, a corresponding error message is created and the chart 300 loops back to 330 where the error message is displayed on the touch screen display 150. If a valid code is received at 330, at 340, receipt information is generated and displayed for the user to review. At 345, it is determined if the user has confirmed the receipt details via the touch screen display 150.

Upon confirmation of the receipt by the user, at 350, a transaction is created and stored in a corresponding database. At 355, a buy receipt is created. At 360, the user inserts cash/notes into the bill validator 110 of the Bitcoin kiosk/ATM 100. At 365, it is determined whether the cash deposit is too little, too much or accurate. If too much, at 370, the extra notes are rejected by the bill validator 110. If too little, the chart 300 loops back to 360 for the user to deposit additional notes. If the transaction is aborted by the user or Bitcoin kiosk/ATM 100, at 375, all notes are rejected and, at 380, the transaction is aborted.

If, at 365, the cash deposit is accurate, at 385, it is determined if the Bitcoin is available from the inventory managed by the Bitcoin kiosk/ATM device 100. If so, at 390, the Bitcoin transaction is completed such that, at 395, the Bitcoin is transmitted from the local digital address associated with the Bitcoin kiosk/ATM device 100 to the destination Bitcoin address provided previously by the user. Finally, at 400, a Bitcoin sent message is presented to the user via the touch screen display 150. Optionally, the Bitcoin sent message may also be transmitted to the user's smart phone or other mobile device. If, at 385, it is determined that the Bitcoin is not available in the inventory, at 405, the Bitcoin kiosk/ATM contacts, via wireless/wired internet connection means 170, an online Bitcoin exchange, such as Bitstamp (www.bitstamp.net), to determine if the Bitcoin is available. If so, at 410, the Bitcoin kiosk/ATM device 100 purchases the necessary Bitcoin from the exchange to complete the transaction. If, at 405, the Bitcoin kiosk/ATM device 100 determines that the Bitcoin exchange does not have the necessary Bitcoin available, at 415, a corresponding error message is presented to the user on the touch screen display 150.

If, at 310, it is determined that the transaction type is a sale of Bitcoin, at 420, the user selects an amount of Bitcoin or equivalent dollars to sell for cash. At 425, it is determined if the user has made the selection. If, at 425, no selection is made within a pre-established time period, the chart 300 loops back to 420. If, at 425, a selection is made, at 430, a transaction is created and stored in a corresponding database. At 435, a redemption receipt/coupon is generated and printed by printer 130. Printing the redemption receipt/coupon allows Bitcoin sale processing to occur. At 440, the user enters a Bitcoin address from which the Bitcoin to be sold is currently held.

At 450, the redemption receipt/coupon is redeemed via the code reader/scanner 140 such that the transaction ID created at 430 is collected and checked. At 455, it is determined if the transaction ID is valid. If not, at 460, a corresponding error message is presented to the user via the touch screen display 150. If, at 455, the transaction ID is validated, at 465, the receipt type is determined. At 470, a buy receipt determination at 465 results in receipt information being generated. If the receipt type is a buy, nothing happens because the buy has been, or should have already been, executed. The kiosk/ATM 100 will merely show a summary of the transaction. If, at 465, a sell receipt is identified a new workflow process is implemented because after a user sends Bitcoin to the kiosk/ATM 100, the Bitcoin network needs to process it. At 475, the amount of Bitcoin from the receipt and the subject transaction record are compared. If the Bitcoin amounts do not match, at 480, it is determined if the transaction has already been terminated. If so, at 485, a receipt is generated. If, at 480, it is determined that the transaction has not yet been aborted at 490, the transaction is aborted and, at 495, any withdrawn Bitcoin is refunded.

If, at 475, it is determined that the Bitcoin amounts do match, at 500, receipt information is evaluated and, at 505, it is determined if the transaction verification is complete. If not, the chart 300 loops back to 500. If, at 505, it is determined that the transaction verification is complete, at 510, it is determined if the transaction verification occurred within 5 minutes. If not, the flow chart 300 advances to 490. If a user does not send Bitcoin to the address provided by the kiosk/ATM 100 within the time period (e.g., 5 minutes), the order is deemed invalid. This is to mitigate market exchange rate fluctuations. If a user wishes to sell Bitcoin after the time period, a new transaction will need to be generated. If, at 510, it is determined that the transaction verification occurred within five minutes, at 515, the Bitcoin amount being offered for sale is verified by network confirmations. In one embodiment, one to six network confirmations (an industry standard) are deemed adequate to verify a suitable amount of Bitcoin held/owned by the seller. The well-established peer-to-peer Bitcoin network confirms transactions by recording the transactions in the transaction log or "blockchain" stored across the peer-to-peer network every 10-minutes. After six confirmed records or "blocks", which may take up to an hour, a transaction is usually considered confirmed beyond reasonable doubt. If a user scans his sell receipt before the Bitcoin network has finished processing it, nothing happens and the user has to wait until it is ready. If, at 515, it is determined that network confirmation has not occurred, at 520, the Bitcoin kiosk/ATM 100 device waits for confirmation and goes inactive. If, at 515, it is determined that network confirmation has occurred, at 525, the user is prompted to depress a withdraw button or icon on the touch screen display 150. At 530, it is determined if there is sufficient cash in the Bitcoin kiosk/ATM device 100 to fund the cash withdraw. If not, at 535, the withdrawal is rejected for lack of available funds. If, at 530, it is determined that there are sufficient funds available, at 540, the user is prompted to confirm the withdrawal. If confirmation occurs, at 545, the transaction is finished and, at 550, the cash/notes are dispensed.

FIGS. 4*a*-4*h* show a series of exemplary screen shots of the type which can be presented to the user via the touch screen display 150. Introductory screen shot 600 depicts a Buy Bitcoin icon 601, Sell Bitcoin icon 602 and Redeem/Lookup Receipt icon 603. Screen shot 605 depicts confirmation of $40 being deposited as part of a buy Bitcoin transaction. Using next icon 606 takes the user to screen shot 610 depicting an instruction 611 for the user to scan in the QR code or type in the destination Bitcoin address. The screen shot 610 also shows the going exchange rate 612 and the fee 613 charged by the operator of the Bitcoin kiosk/ATM device 100 and the price of the purchase 614. Using next icon 615 takes the user to screen shot 620 depicting a confirmation of the Bitcoin being transmitted to the destination Bitcoin address. The screen shot 620 also shows a transaction verification in the form of a QR code 621. Use of a finish icon 622 ends the buy transaction. Screen shot 625 depicts an initial page responsive to a sell Bitcoin transaction. The screen shot 625 also shows the going exchange rate 626 and the fee 627 charged by the operator of the Bitcoin kiosk/ATM device 100 and the price of the sale 628. An amount of Bitcoin to be sold in dollars may be entered using dynamic icon 629. Using next icon 630 takes the user to screen shot 635 prompting the user to send the Bitcoin to the Bitcoin address associated with the Bitcoin kiosk/ATM device 100 via QR code 636 and a timer 637 associated therewith. Use of a finish icon 638 ends the first portion of the sell Bitcoin transaction (i.e., prior to redeeming the redemption receipt/coupon which is part two of the sell Bitcoin transaction). Screen shot 640 is an initial screen shot associated with redeeming a redemption receipt/coupon prompting a scan of the transaction number 641 from the redemption receipt/coupon. Using next icon 642 takes the user to screen shot 645 depicting a statement that the cash is available to withdraw by using withdraw icon 646.

FIG. 5 shows an exemplary housing elevation 106 of a housing 105 containing a bill validator 110, bill dispenser 120, printer 130, code reader/scanner 140, touch screen display 150, debit/credit card reader 155 and optional button panel 165 which may facilitate the embodiments of the present invention.

Figure 6:
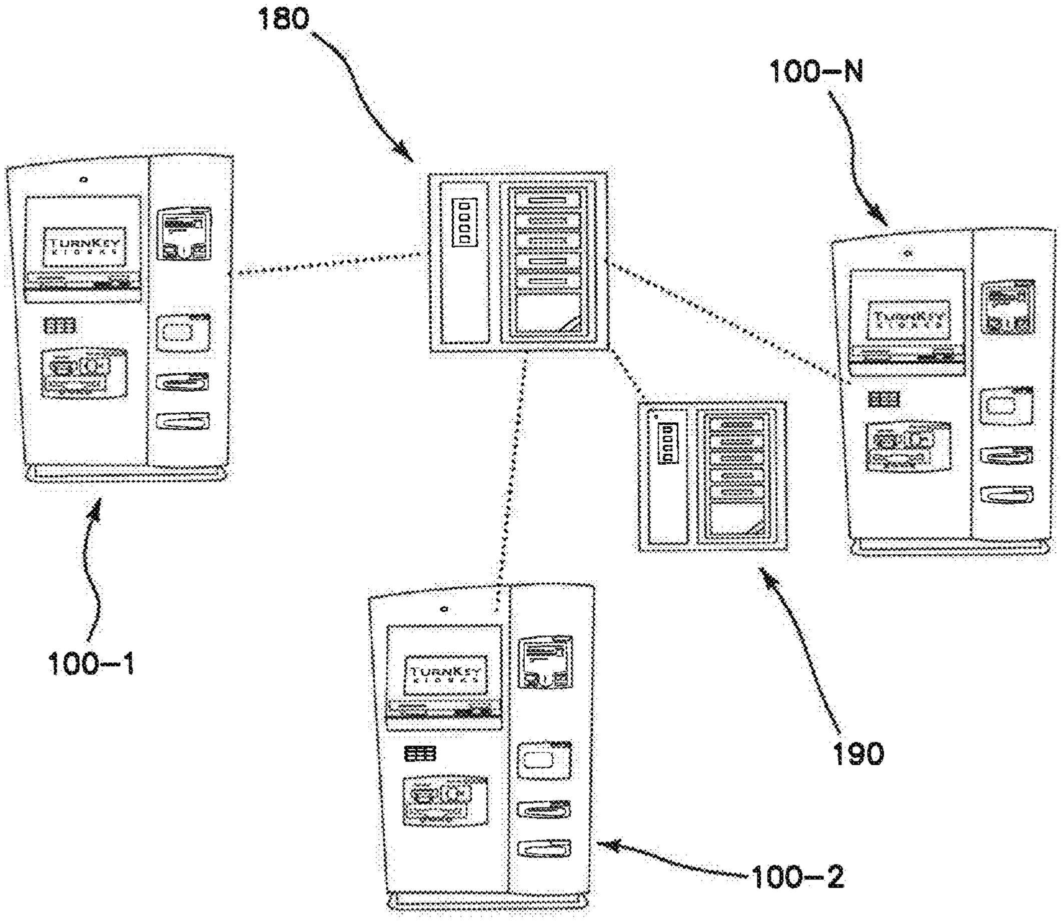
FIG. 6 illustrates a network of kiosk/ATM devices according to the embodiments of the present invention.

FIG. 6 shows a network comprising a plurality of Bitcoin kiosk/ATM devices 100-1 through 100-N in wired and/or wireless communication with a central computer/server 180. The central computer/server 180 may control various functionalities of the Bitcoin kiosk/ATM devices 100-1 through 100-N. In one embodiment, the Bitcoin kiosk/ATM devices 100-1 through 100-N may be substantially dummy devices or may have modest to significant processing power. The central computer/server 180 may also communicate with a website hosting server 190 to facilitate communication with a Bitcoin exchange as described above.

Figure 7:
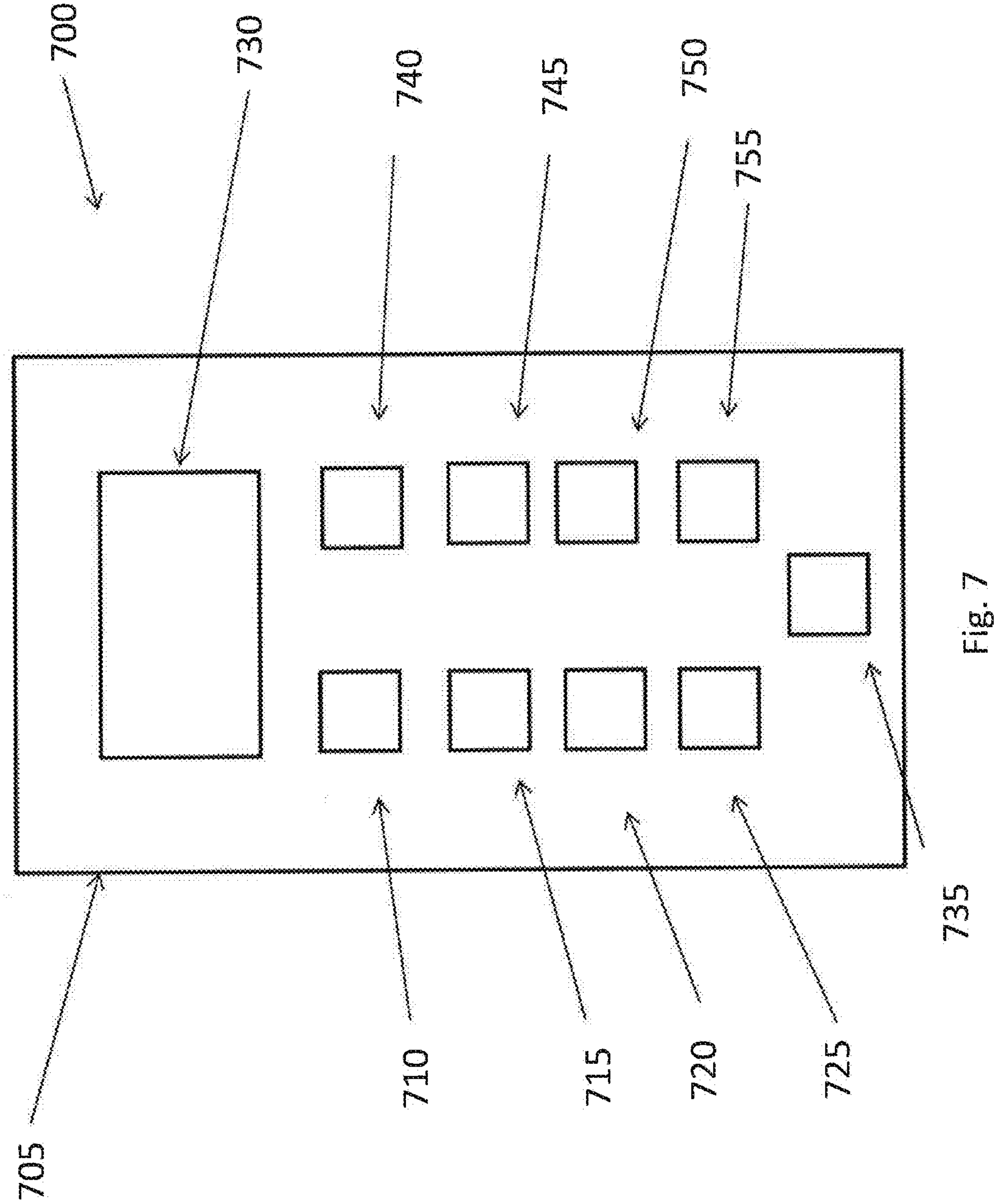
FIG. 7 illustrates a block diagram of a Bitcoin kiosk/ATM device with security enhancements according to the embodiments of the present invention.
Figure 10A:
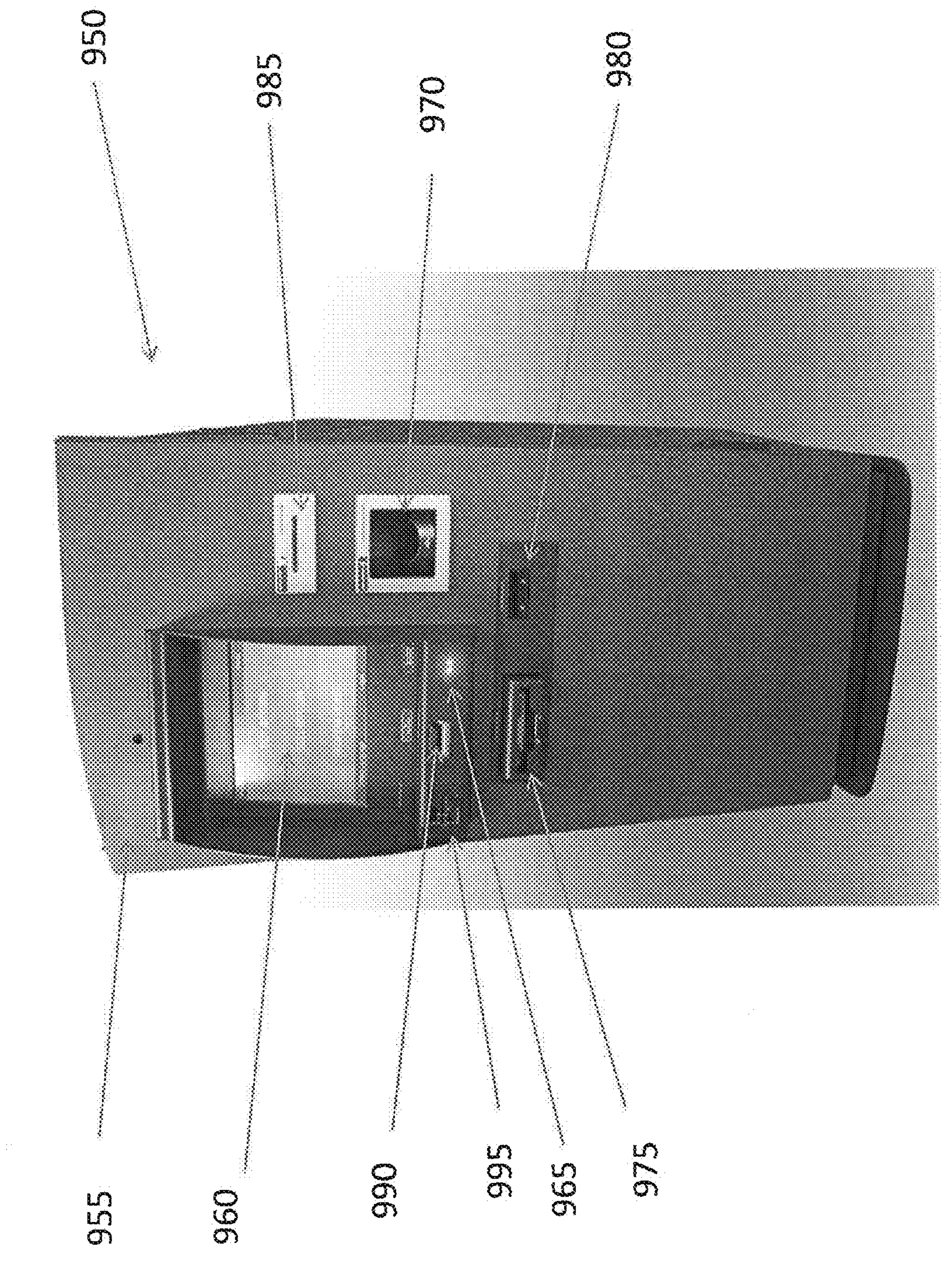
FIGS. 10*a*-10*c* show an exemplary Bitcoin kiosk/ATM device according to the embodiments of the present invention.
Figure 10B:
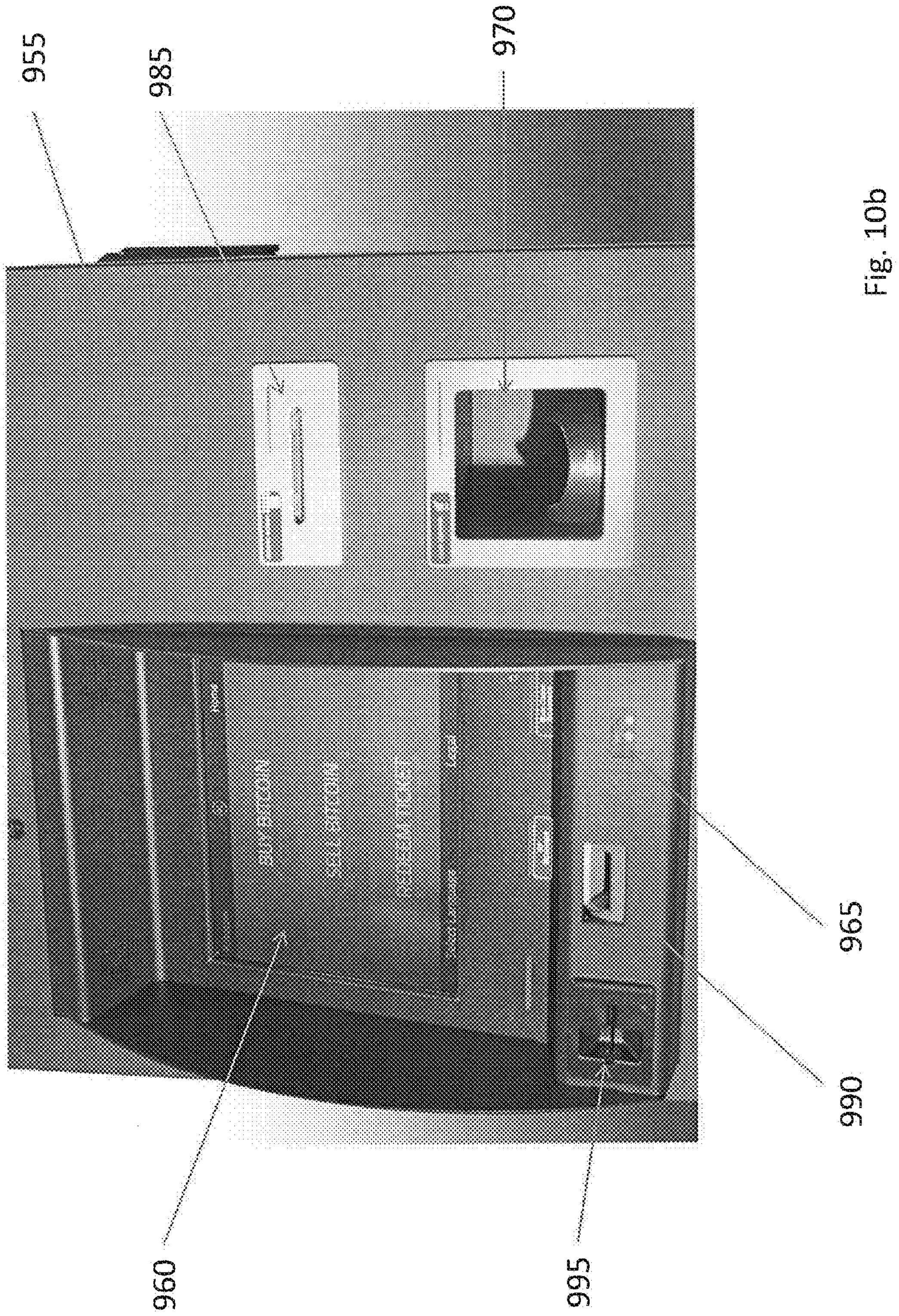
Figure 10C:
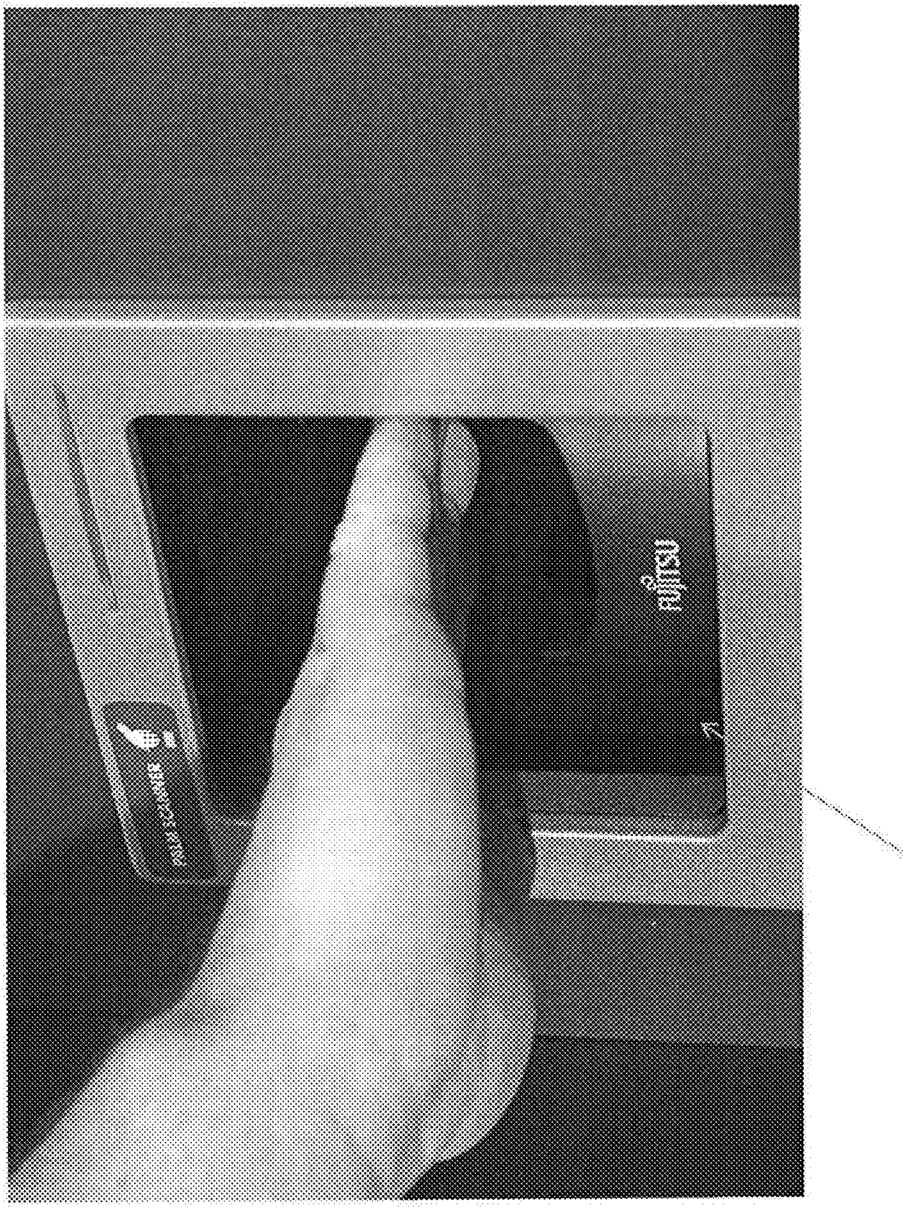

FIG. 7 shows a block diagram of a Bitcoin kiosk/ATM device 700 with security enhancements integrated therein and associated therewith. The Bitcoin/ATM device 700 comprises a bill validator 710, bill dispenser 715, printer 720, scanner/reader 725, touch screen display 730, processor/controller 735 and wireless internet connection means (e.g. modem) 740 communicatively joined together using conventional means. Security features comprise a biometric interface 745, magnetic card reader 750 and camera/web cam 755. A housing 705 contains and protects the aforementioned components and any others incorporated into the Bitcoin kiosk/ATM device 700. FIGS. 10*a*-10*c* show an exemplary Bitcoin kiosk/ATM device 950 including a housing 955 containing a user interface in the form of a touch screen 960, barcode scanner 965 configured to read information from a display of a mobile device or tablet, palm vein reader 970, bill dispenser 975, bill validator 980, receipt printer 985, ID scanner 990 and card reader 995. While shown as a standalone unit, the housing may define a standalone device, wall-mounted device, wall-embedded device and the like. As set forth herein, software and firmware assist with the operation of the Bitcoin kiosk/ATM 700 as detailed below.

Figure 8:
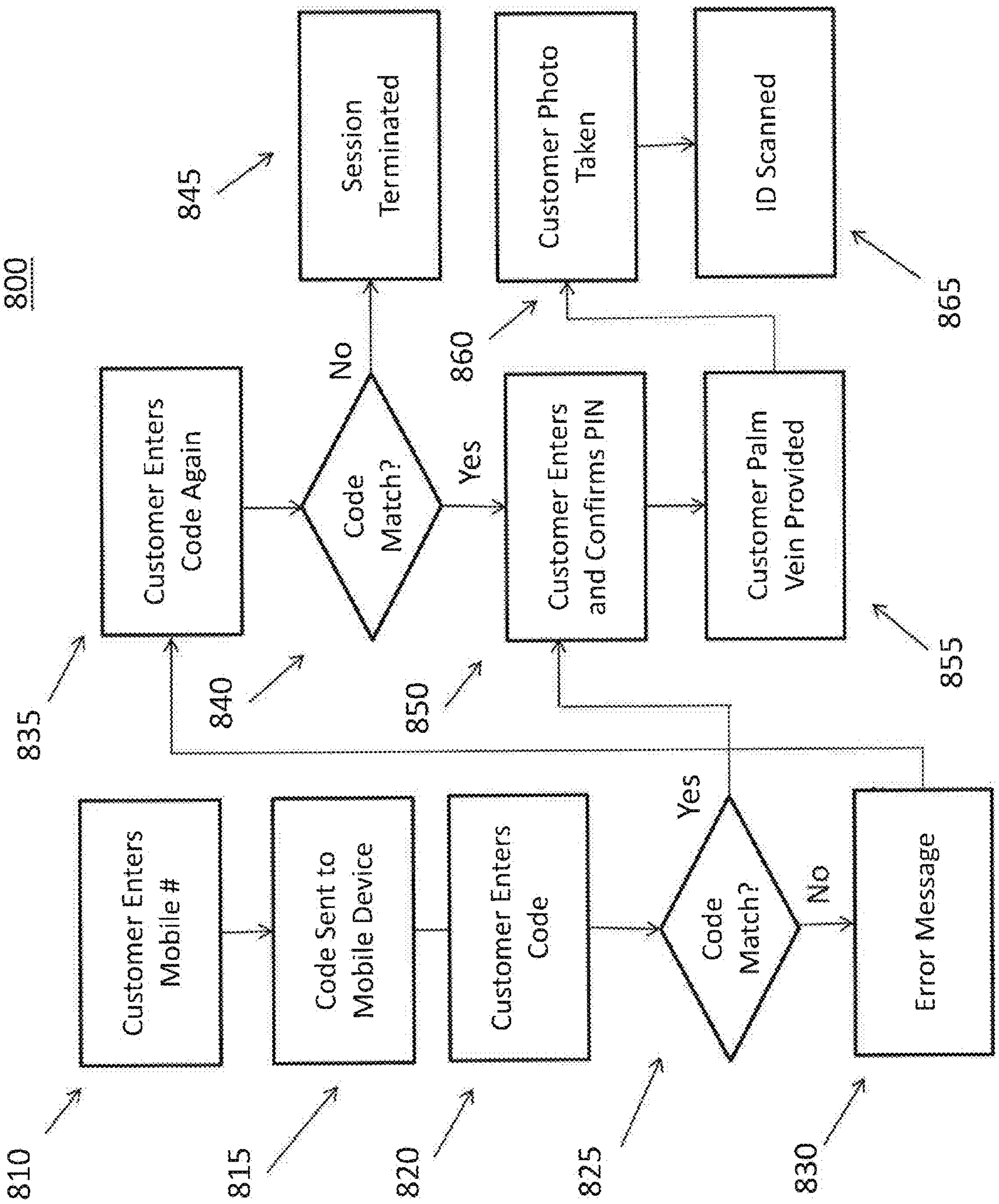
FIG. 8 illustrates a flow chart of a first enrollment and security protocol associated with the Bitcoin kiosk/ATM device according to the embodiments of the present invention.

FIG. 8 shows a flow chart 800 detailing a first method of enrolling a customer or user and authorizing a Bitcoin transaction at the Bitcoin kiosk/ATM device 700. At 810, a customer enters a mobile phone number into the Bitcoin kiosk/ATM device 700 via the touch screen display 730 or other interface. At 815, the system generates and transmits to the customer's mobile phone a SMS or text message including a random code. At 820, the Bitcoin kiosk/ATM device 700 then prompts the customer to enter the code in the text message. At 825, it is determined if the entered code matches the code sent as part of the text message. If not, at 830, an error message is generated and, at 835, the customer is prompted to enter the code again. If, at 840, it is again determined that the code entered a second time does not match, at 845, the session is terminated. Alternatively, the customer may be prompted to accept sending of a second text and code. If, at 825 or 840, the entered code matches the code in the text message, at 850, the customer is prompted to enter and confirm a PIN (e.g., 4 digit #). At 855, the customer is prompted to provide a palm vein pattern via the biometric interface 745. At 860, the customer is prompted to pose for a photo using the camera/web cam 755. At 865, the customer is promoted to scan their driver's license or passport using the magnetic card reader 750 or reader/scanner 725, respectively. As described, the enrollment process collects three pieces of information including: (i) what the customer knows (i.e., PIN); (ii) what the customer possess (i.e., mobile phone) and (iii) who the customer is (i.e., palm vein pattern).

All of the information collected during the enrollment process, including the PIN, palm vein pattern, photo and scanned ID are stored into a user file for later retrieval as needed such as a future visit to the Bitcoin kiosk/ATM device 700. In one embodiment, the live photo is compared to the photo on the scanned ID to determine a match. A lack of a match between the live photo and the photo on the scanned ID results in termination of the enrollment and a prompt to enroll at a live location.

Figure 9A:
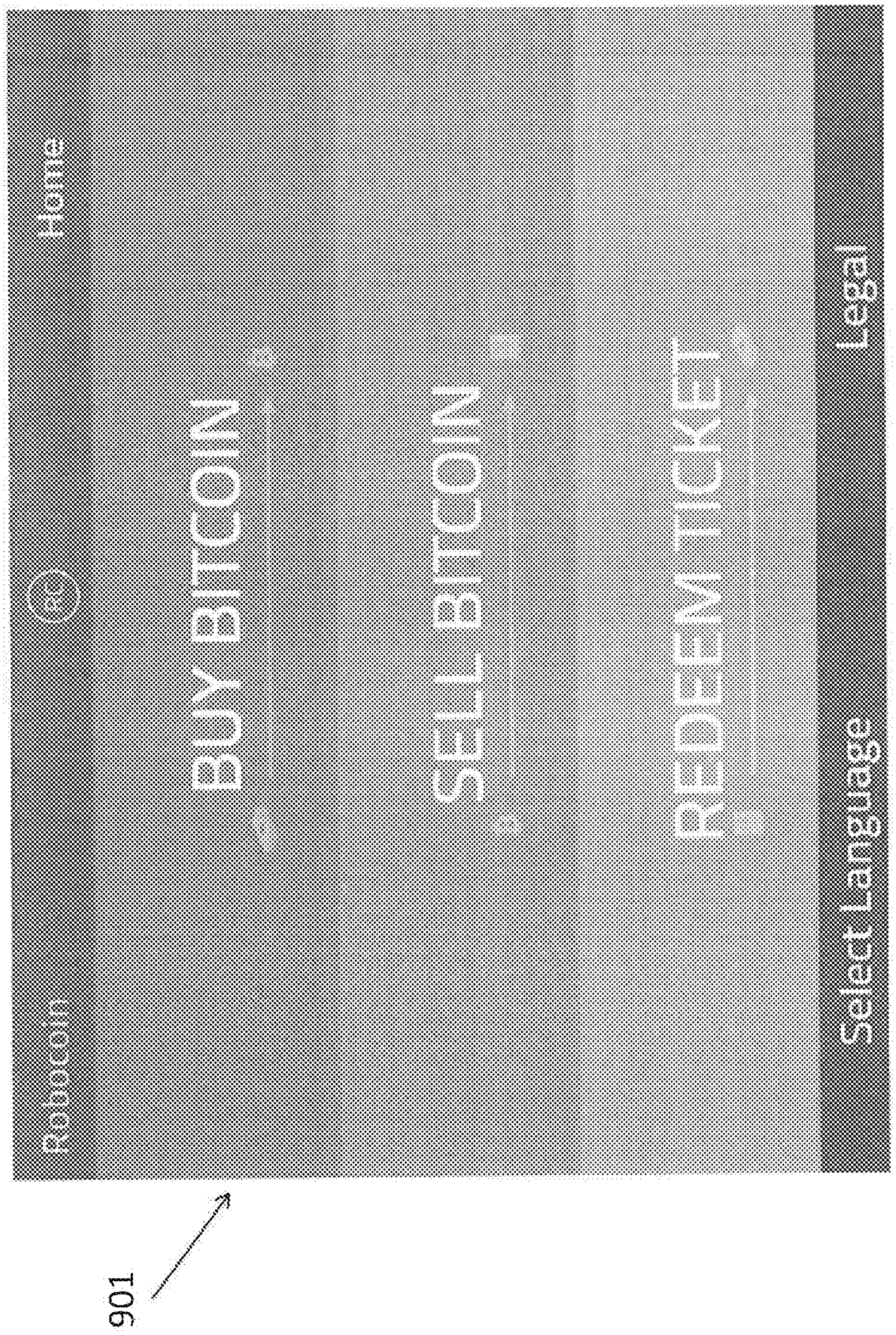
FIGS. 9*a*-9*i* illustrate several screen shots commensurate with the flow chart of FIG. 8 according to the embodiments of the present invention.
Figure 9B:
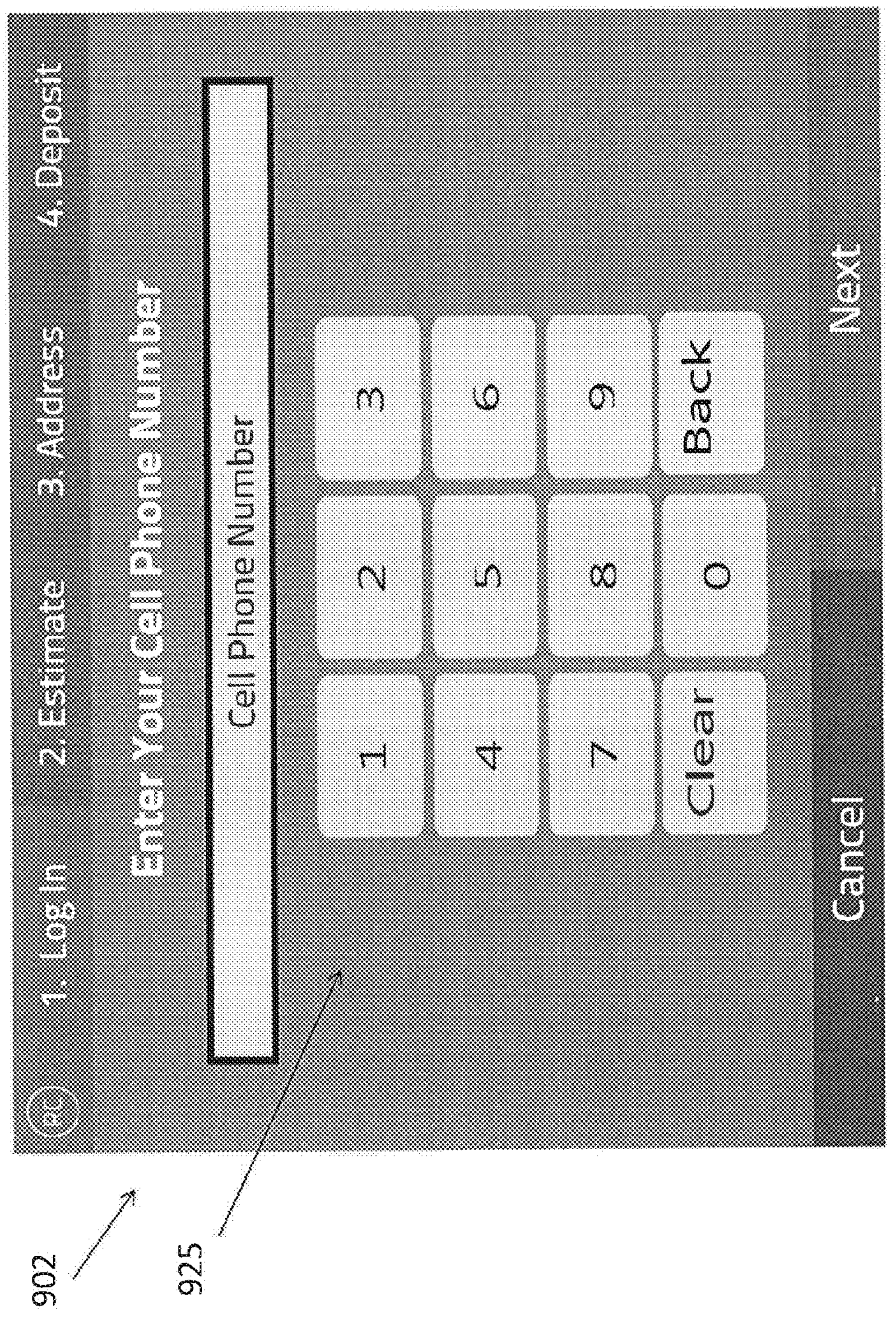
Figure 9C:
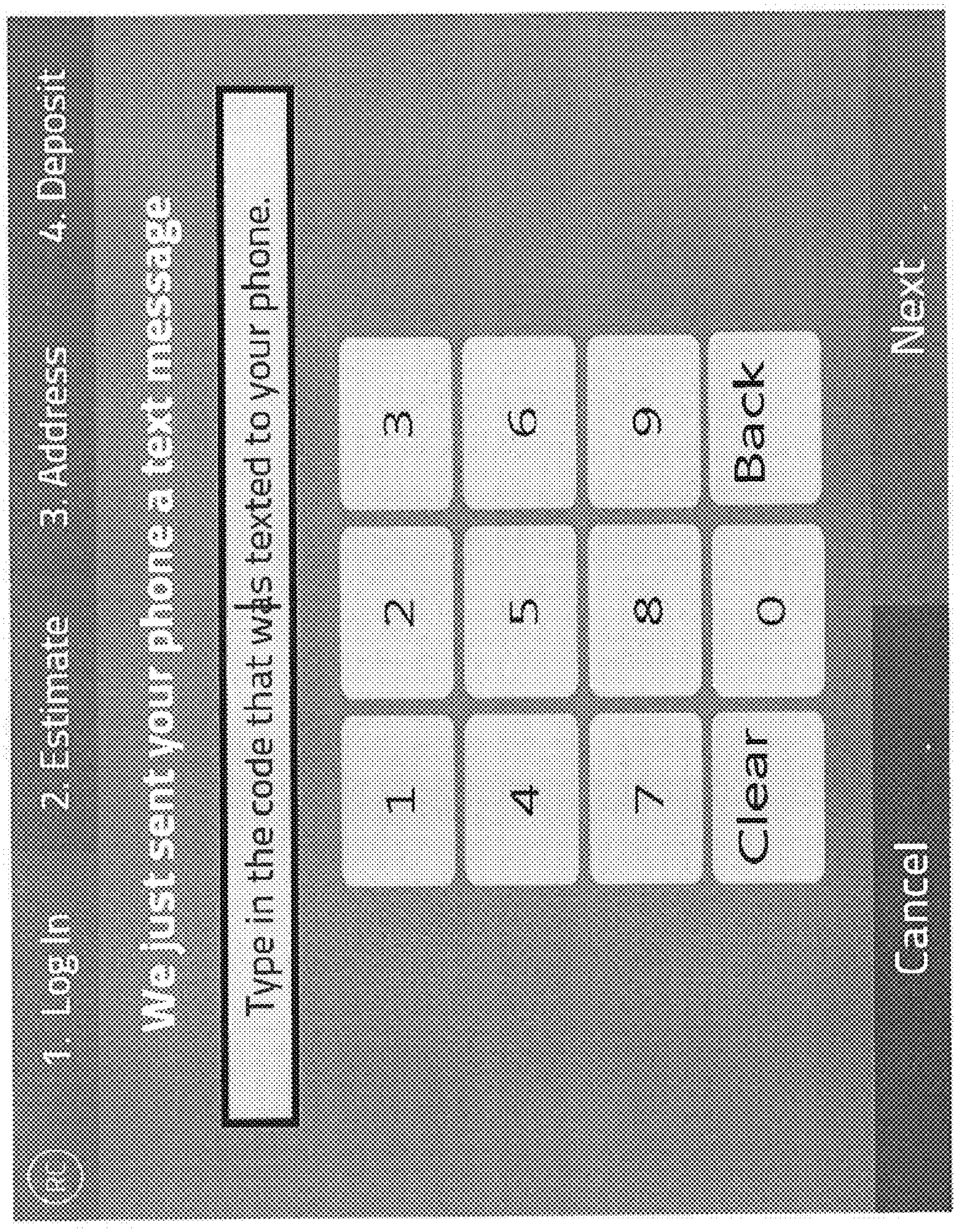
Figure 9D:
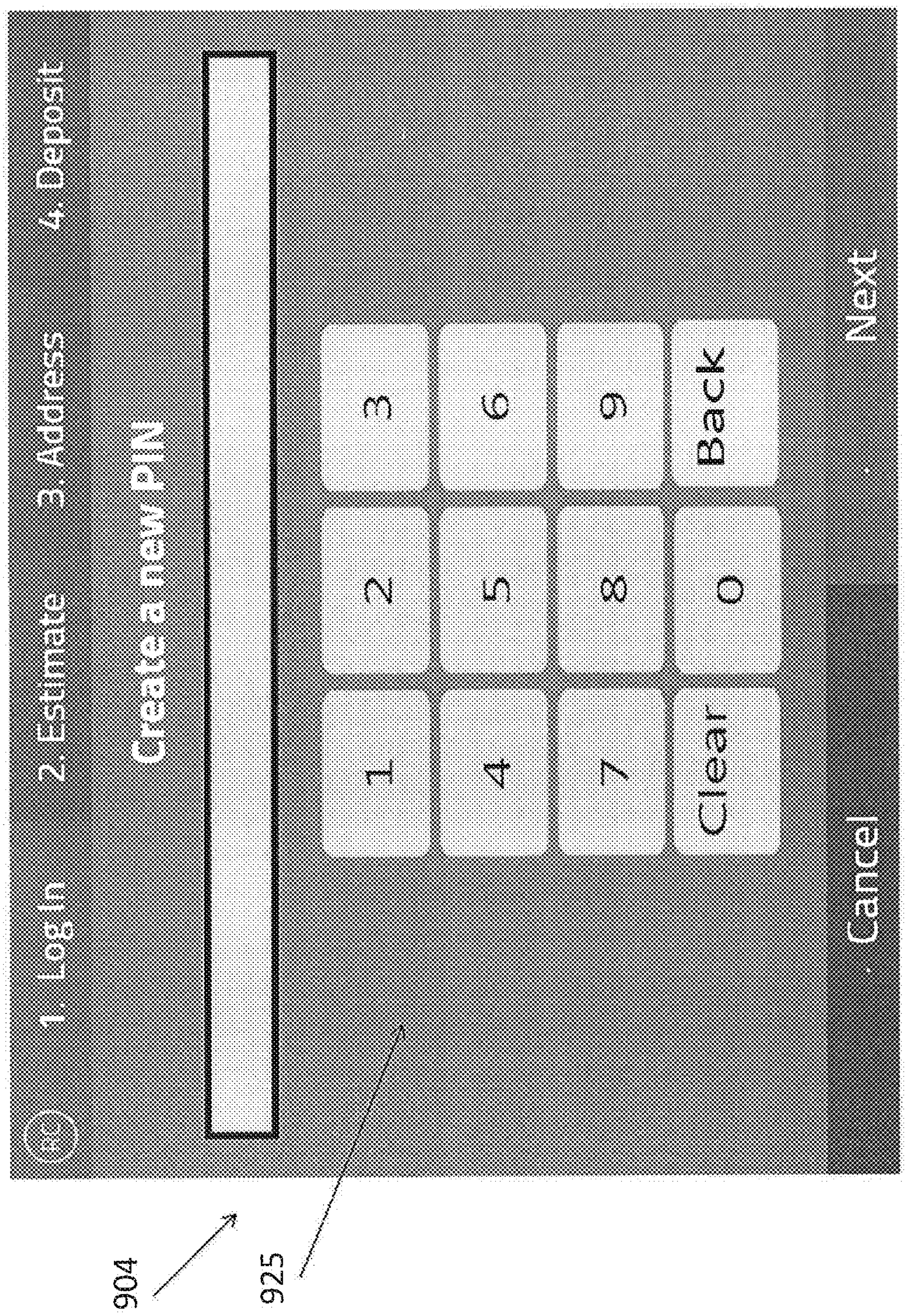
Figure 9E:
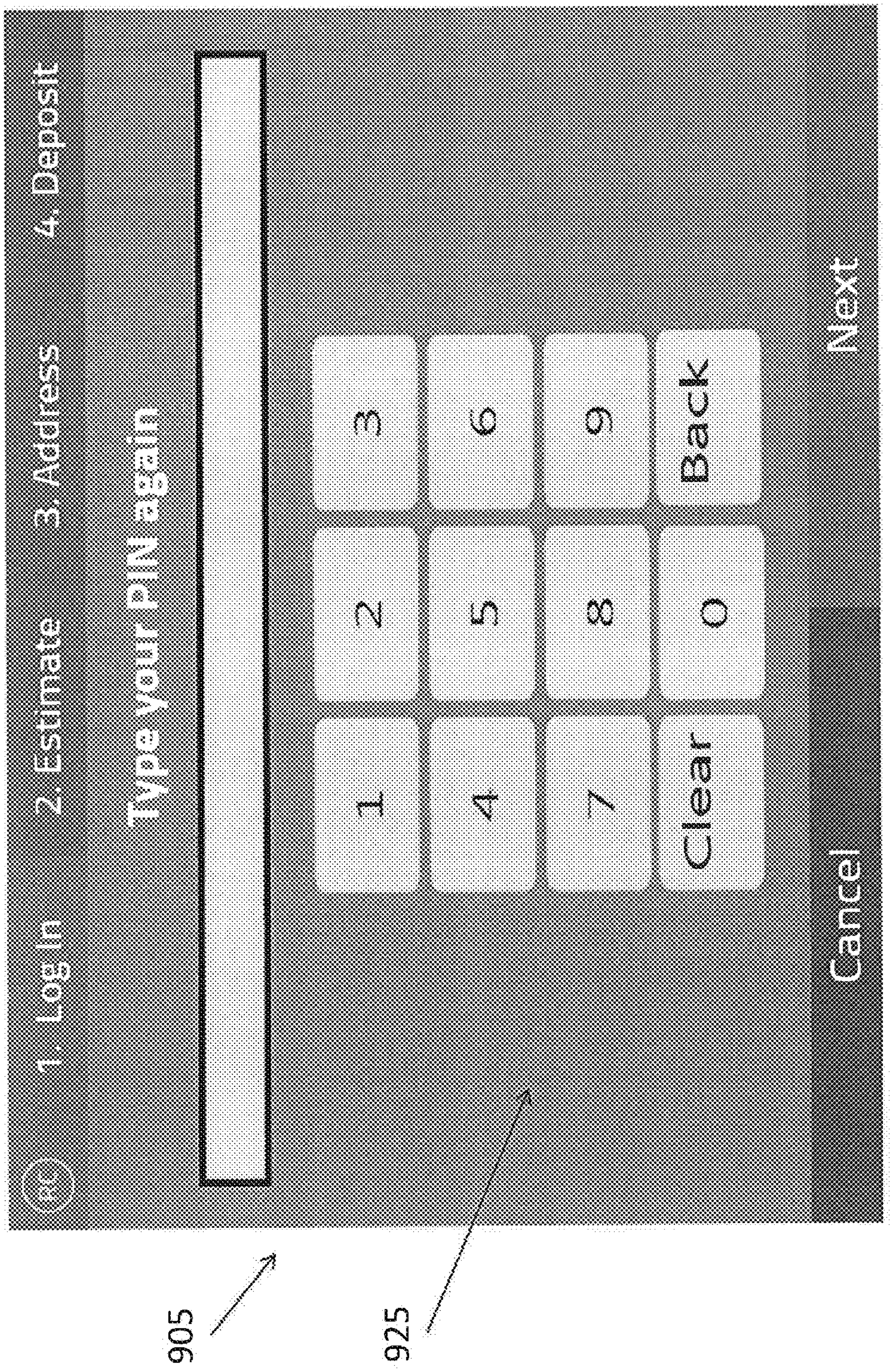
Figure 9F:
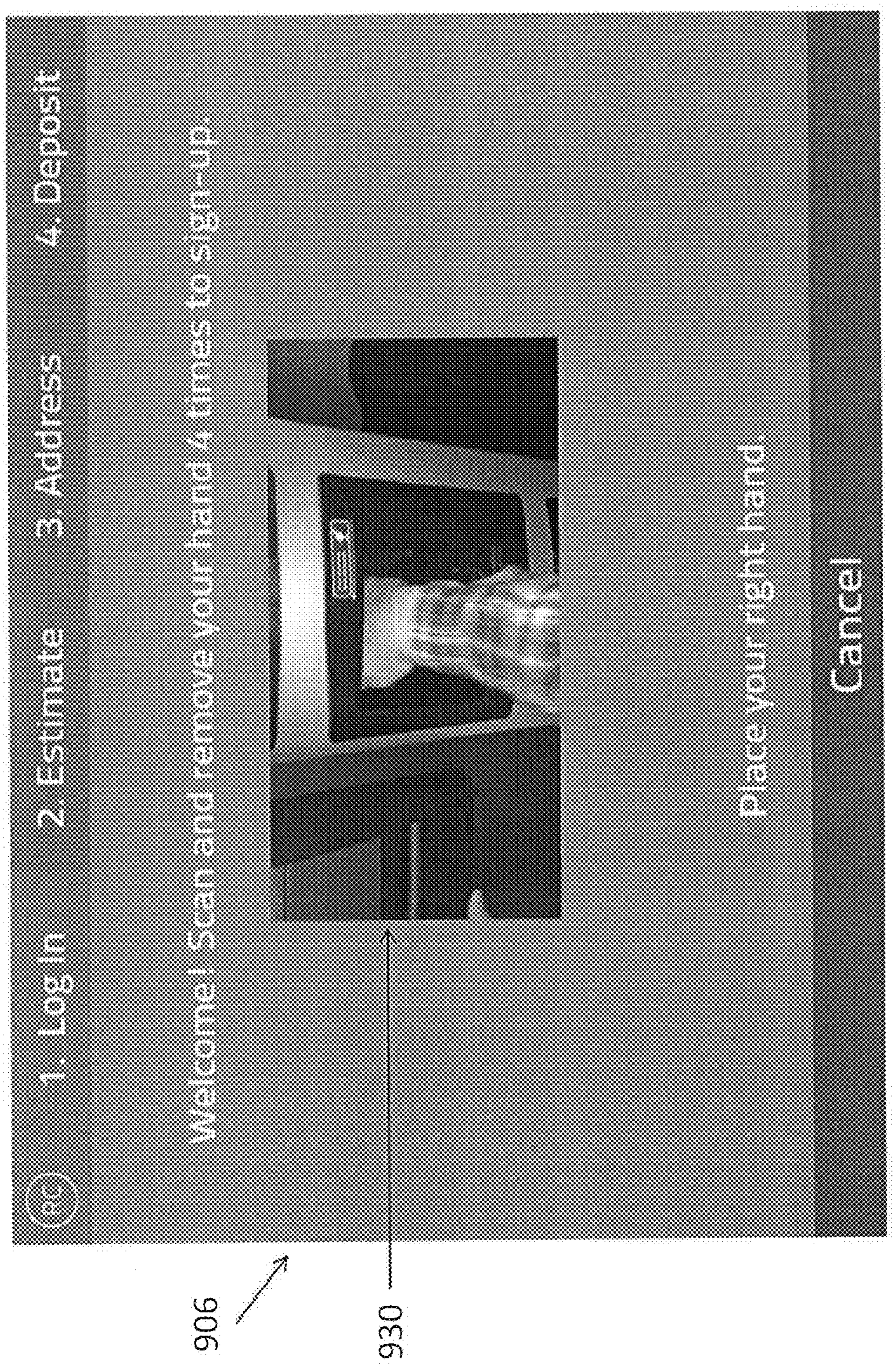
Figure 9G:
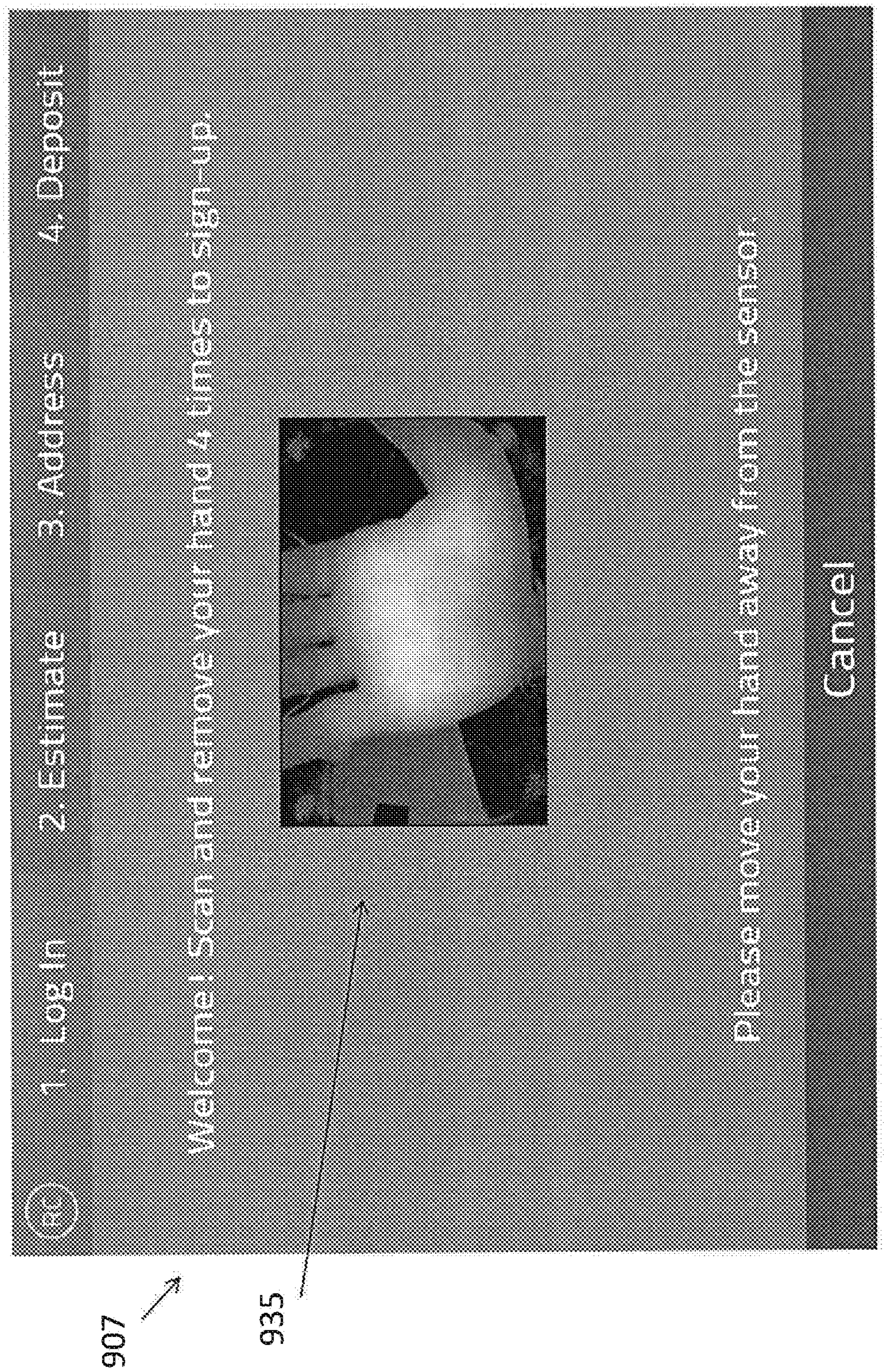
Figure 9H:
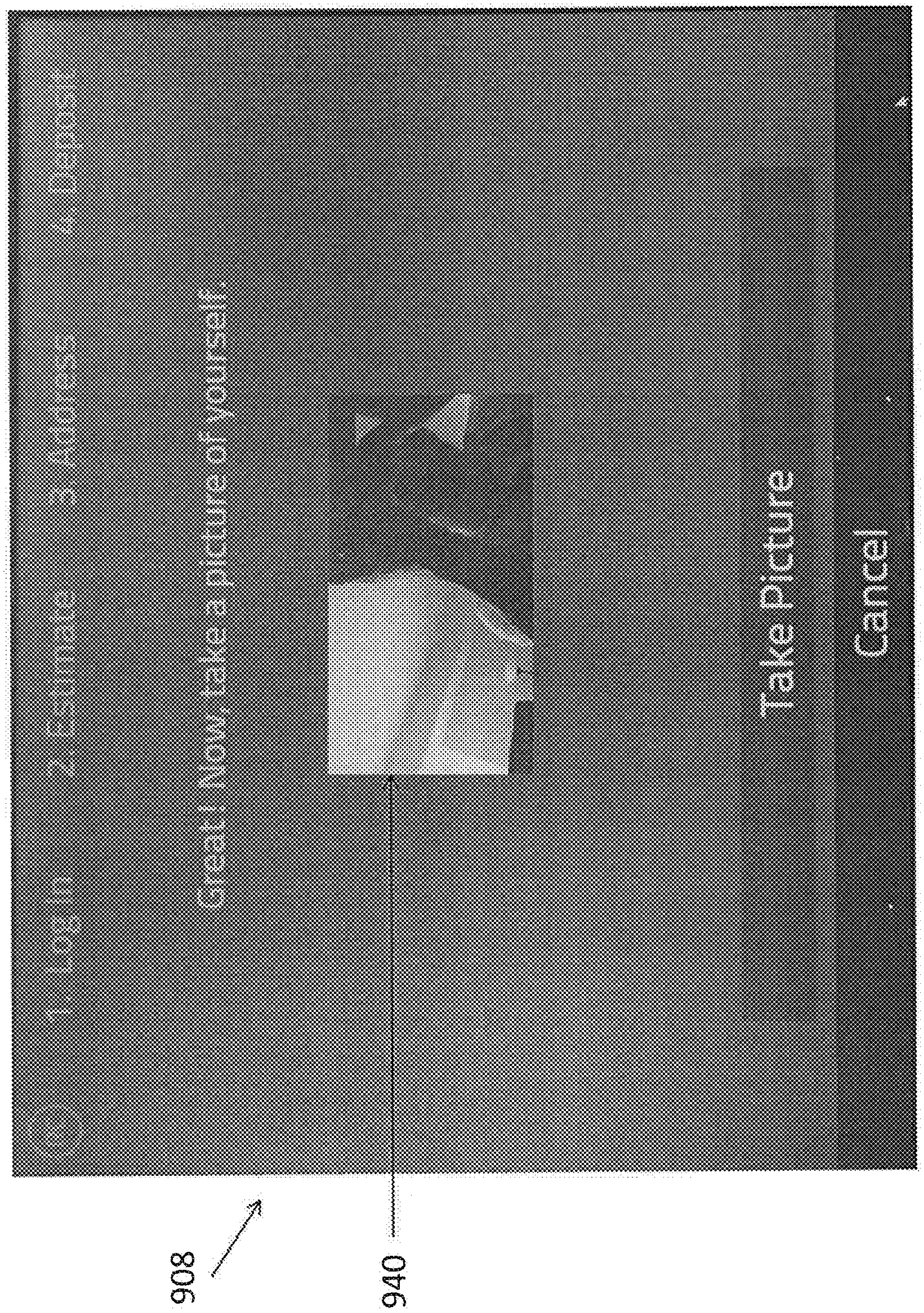
Figure 9I:
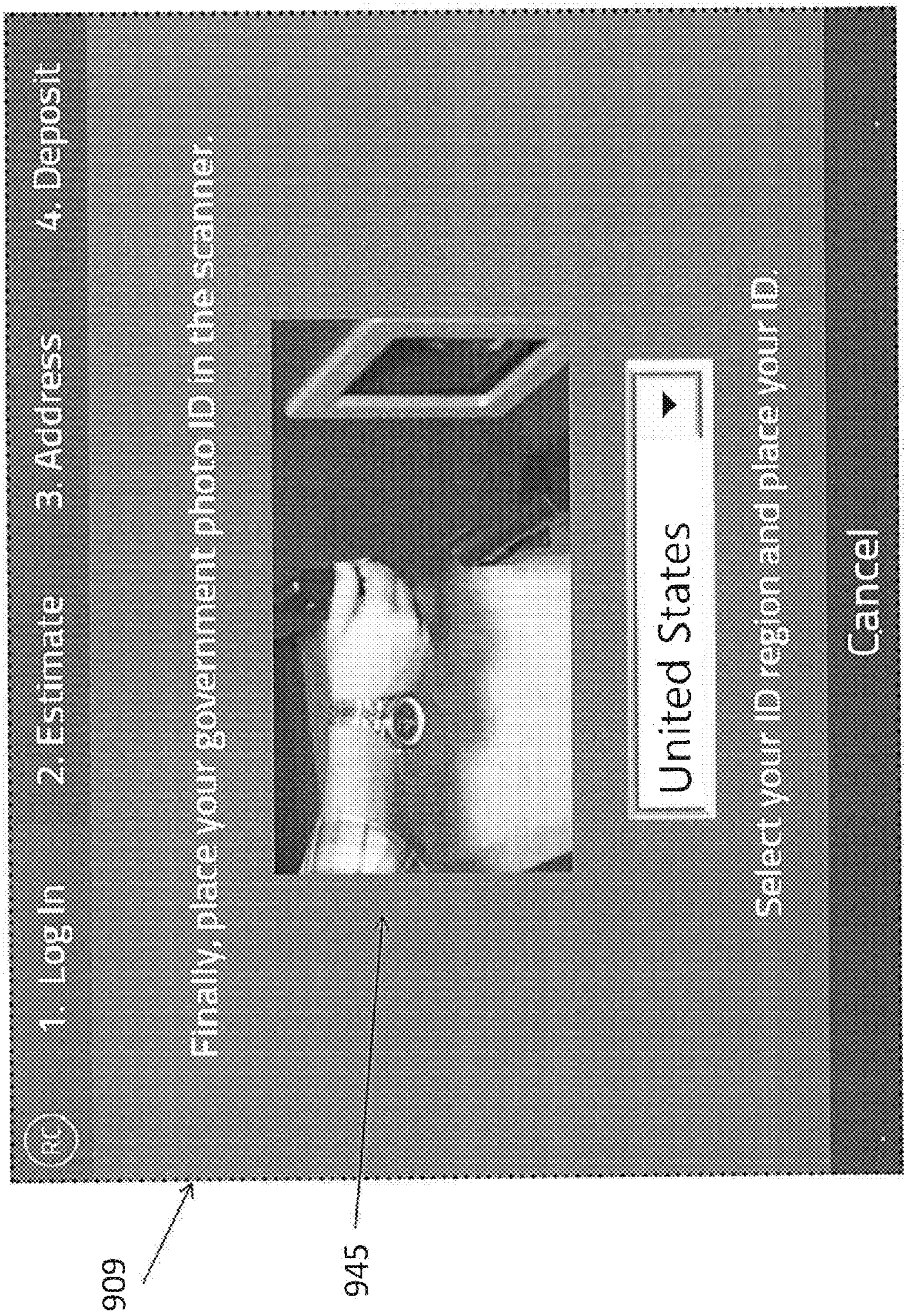

FIGS. 9*a*-9*i* show several screen shots commensurate with the flow chart of FIG. 8 according to the embodiments of the present invention. FIG. 9*a* shows an opening screen 901 giving the customer several options including buying Bitcoin, selling Bitcoin or redeeming a ticket. FIG. 9*b* shows a screen shot 902 including a touch pad 925 allowing the customer to enter the customer's mobile device # as prompted. FIG. 9*c* shows a screen shot 903 prompting the customer to enter, via the touch pad 925, a code sent via text to the customer's mobile device #. FIG. 9*d* shows a screen shot 904 prompting the customer to enter a PIN via the touch pad 925. FIG. 9*e* shows a screen shot 905 prompting the customer to re-enter a PIN via the touch pad 925. FIGS. 9*f* and 9*g* show screen shots 906, 907 prompting the customer to provide palm vein pattern and a video or static image 930 instructing the customer. FIG. 9*h* shows a screen shot 908 prompting the customer to take a photo of himself or herself and a video or static image 940 instructing the customer. FIG. 9*i* shows a screen shot 909 prompting the customer to take scan an ID and a video or static image 945 instructing the customer.

In other embodiments, the enrollment process involves connection with a database of known corrupt or unsavory individuals and, if said customer is in said database, denying the customer access to a transaction on said device. If the individual is in said database of known corrupt or unsavory individuals the system may notify authorities. For example, the names of customers may be run through a database administered by the Office of Foreign Assets Control (OFAC). The OFAC database includes known terrorists, criminals and the like.

Although the invention has been described in detail with reference to several embodiments, additional variations and modifications exist within the scope and spirit of the invention as described and defined in the following claims.

We claim:

1. A kiosk device comprising: a bill validator; a bill dispenser; a user interface; biometric interface; ID scanner/reader; camera; and a processor programmed to run executable instructions, said executable instructions causing said processor to facilitate: (i) receipt of a customer's mobile phone number via the user interface; (ii) transmission of a text message including a random code to the mobile phone of the customer; (iii) receipt of the random code entered by the customer via the user interface to confirm accuracy of said customer's mobile phone number received in step (i); (iv) receipt of a PIN entered by the customer via the user interface; (v) receipt of biometric data a palm vein pattern via the biometric interface; (vi) receipt of a live customer photo via the camera; and (vii) receipt of identification data including a pre-existing photo via the ID scanner/reader, wherein said processor is further programmed to run executable instructions, which responsive to said card reader scrapping data from an identification article of the customer, causing said processor to facilitate: connection with a database of known corrupt or unsavory individuals and, if said customer is in said database, deny the customer access to a transaction on said kiosk device.

2. The kiosk device of claim 1 wherein said processor is further programmed to run executable instructions, which responsive to said card reader scrapping data from an identification article of the customer, causing said processor to facilitate: connection with a database of known corrupt or unsavory individuals and if said customer is in said database, notify authorities.

3. The kiosk device of claim 1 further comprising internet connection means.

4. The kiosk device of claim 1 further comprising a card reader and/or bar code scanner.

5. A method of facilitating digital transactions at an electronic kiosk comprising: (i) receiving a customer's mobile phone number via an electronic user interface; (ii) transmitting a text message including a random code to a mobile phone of a customer; (iii) receiving and of the random code entered by the customer via the electronic user interface and confirming accuracy of said customer's mobile phone number received in step (i); (iv) receiving a PIN entered by the customer via the electronic user interface; (v) receiving biometric data a palm vein pattern via a biometric interface; (vi) receiving a live customer photo via a camera; and (vii) receiving identification data including a pre-existing photo via an ID scanner/reader, wherein a processor is further programmed to run executable instructions, which responsive to a reader scrapping data from an identification article of the customer, causing said processor to facilitate: connection with a database of known corrupt or unsavory individuals and, if said customer is in said database, deny the customer access to a transaction on said kiosk device.

6. The method of claim 5 further comprising connecting with a database of known corrupt or unsavory individuals and, if said customer is in said database, notifying authorities.

7. A kiosk device comprising: a bill validator; a bill dispenser; a user interface; biometric interface; ID scanner/reader; camera; and a processor programmed to run executable instructions, said executable instructions causing said processor to facilitate: (i) receipt of a customer's mobile phone number via the user interface; (ii) transmission of a text message including a random code to the mobile phone of the customer; (iii) receipt confirmation of the random code entered by the customer via the user interface to confirm accuracy of said customer's mobile phone number received in step (i); (iv) receipt of a PIN entered by the customer via the user interface; (v) receipt of biometric data via the biometric interface; (vi) receipt of a live customer photo via the camera; and (vii) receipt of identification data including a pre-existing photo via the ID scanner/reader; and wherein said transaction involves (i) transmitting Bitcoin to a digital address in exchange for cash inserted into said kiosk device via said bill validator; or (ii) dispensing dispense cash via said bill dispenser in exchange for Bitcoin transmitted from said digital address to a digital Bitcoin inventory in communication with said kiosk device, wherein said processor is further programmed to run executable instructions, which responsive to said card reader scrapping data from an identification article of the customer, causing said processor to facilitate: connection with a database of known corrupt or unsavory individuals and, if said customer is in said database, deny the customer access to a transaction on said kiosk device.

8. The kiosk device of claim 7 wherein said processor is further programmed to run executable instructions, which responsive to said card reader scrapping data from an identification article of the customer, causing said processor to facilitate: connection with a database of known corrupt or unsavory individuals and if said customer is in said database, notify authorities.

9. The kiosk device of claim 7 further comprising internet connection means.

10. The kiosk device of claim 7 further comprising a card reader and/or bar code scanner.

11. A method of facilitating digital transactions comprising: configuring a kiosk device for: (i) receiving a customer's mobile phone number via an electronic user interface; (ii) transmitting a text message including a random code to a mobile phone of a customer; (iii) receiving and confirming of the random code entered by the customer via the electronic user interface and confirming accuracy of said customer's mobile phone number received in step (i); (iv) receiving a PIN entered by the customer via the electronic user interface; (v) receiving biometric data a palm vein pattern via a biometric interface; (vi) receiving a live customer photo via a camera; (vii) receiving identification data including pre-existing photo via an ID scanner/reader; and (viii) transmitting Bitcoin to a digital address in exchange for cash inserted into said kiosk device via said bill validator or dispensing cash via said bill dispenser in exchange for Bitcoin transmitted from said digital address to a digital Bitcoin inventory in communication with said kiosk device, wherein a processor is further programmed to run executable instructions, which responsive to a reader scrapping data from an identification article of the customer, causing said processor to facilitate: connection with a database of known corrupt or unsavory individuals and, if said customer is in said database, deny the customer access to a transaction on said kiosk device.

12. The method of claim 11 further comprising connecting with a database of known corrupt or unsavory individuals and if said customer is in said database, notify authorities.

* * * * *